United States Patent
Saha et al.

(10) Patent No.: US 11,456,686 B2
(45) Date of Patent: Sep. 27, 2022

(54) ROTATING ELECTRICAL MACHINE CONTROL DEVICE

(71) Applicant: AISIN CORPORATION, Kariya (JP)

(72) Inventors: Subrata Saha, Anjo (JP); Isao Fujiwara, Nagoya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/258,598

(22) PCT Filed: Aug. 30, 2019

(86) PCT No.: PCT/JP2019/034145
§ 371 (c)(1),
(2) Date: Jan. 7, 2021

(87) PCT Pub. No.: WO2020/045636
PCT Pub. Date: Mar. 5, 2020

(65) Prior Publication Data
US 2021/0167702 A1    Jun. 3, 2021

(30) Foreign Application Priority Data

Aug. 31, 2018  (JP) .............................. JP2018-163679

(51) Int. Cl.
*H02P 6/00*      (2016.01)
(52) U.S. Cl.
CPC .................................. *H02P 6/005* (2013.01)
(58) Field of Classification Search
CPC ...................................................... H02P 6/005
See application file for complete search history.

(56) References Cited

U.S. PATENT DOCUMENTS

| 2007/0121354 A1* | 5/2007 | Jones ...................... H02P 9/102 |
| | | 363/67 |
| 2013/0297160 A1* | 11/2013 | Kar ................. B60W 30/18072 |
| | | 701/54 |

FOREIGN PATENT DOCUMENTS

| JP | 2013-132135  A | 7/2013 |
| JP | 2013132135 | * 7/2013 |
| JP | 2015-139341  A | 7/2015 |

(Continued)

OTHER PUBLICATIONS

Translation of JP2015139341 has been attached.*

(Continued)

*Primary Examiner* — Zoheb S Imtiaz
(74) *Attorney, Agent, or Firm* — Sughrue Mion, PLLC

(57) ABSTRACT

Two inverters provided at respective both ends of open-end windings are appropriately controlled. A rotating electrical machine control device (1) that can control a first inverter (11) and a second inverter (12) by a plurality of control schemes, respectively, the control schemes differing from each other in at least one of a switching pattern and a switching frequency and being independent of each other, has a control mode in which the first inverter (11) and the second inverter (12) are controlled by the same control scheme in a first speed region (VR1) in which the rotational speed of a rotating electrical machine (80), and the first inverter (11) and the second inverter (12) are controlled by different control schemes in a second speed region (VR2) in which the rotational speed of the rotating electrical machine (80) is higher than in the first speed region (VR1).

14 Claims, 8 Drawing Sheets

(56) References Cited

FOREIGN PATENT DOCUMENTS

| JP | 2015139341 | * | 7/2015 |
| JP | 2016-92946 A | | 5/2016 |
| JP | 2016-123168 A | | 7/2016 |
| JP | 2016123168 | * | 7/2016 |
| JP | 2017-005810 A | | 1/2017 |
| JP | 2017005810 | * | 1/2017 |

OTHER PUBLICATIONS

Translation of JP2017005810 has been attached.*
Translation of JP2013132135 has been attached.*
Translation of JP2016123168 has been attached.*
V. Oleschuk et al., "Dual Inverter-Fed Traction Drive with DC Sources Power Balancing Based on Synchronized PWM", IEEE, Conference Paper, Jun. 2007, pp. 260-265, 1-4244-0743-5/07.
International Search Report for PCT/JP2019/034145, dated Oct. 21, 2019.
European Search Report dated Jul. 16, 2021 in European Application No. 19853386.1.
Kanchan et al., "Synchronised carrier-based SVPWM signal generation scheme for the entire modulation range extending up to six-step mode using the sampled amplitudes of reference phase voltages", IET Electric Power Applications, 2007, vol. 1, No. 3, pp. 407-415 (10 pages total).
Rovere et al., "IGBT-SiC Dual Fed Open End Winding PMSM Drive", IEEE International Electric Machines and Drives Conference (IEMDC), IEEE, May 21, 2017 (6 pages total).

* cited by examiner

ROTATING ELECTRICAL MACHINE CONTROL DEVICE

CROSS REFERENCE TO RELATED APPLICATIONS

This application is a National Stage of International Application No. PCT/JP2019/034145 filed Aug. 30, 2019, which designates the United States, incorporated herein by reference, and which claims the benefit of priority from Japanese Patent Application No. 2018-163679 filed Aug. 31, 2018, the entire contents of which are incorporated herein by reference.

TECHNICAL FIELD

The present disclosure relates to a rotating electrical machine control device that controls drive of a rotating electrical machine having open-end windings through two inverters.

BACKGROUND ART

The IEEE paper "Dual Inverter-Fed Traction Drive with DC Sources Power Balancing Based on Synchronized PWM" released in 2007 by V. Oleschuk et al. discloses a control device that controls drive of a three-phase alternating-current type rotating electrical machine by performing switching control on inverters provided at respective both ends of three-phase open-end windings which are included in the rotating electrical machine. Meanwhile, there is also a well-known mode that, for example, controls drive of a rotating electrical machine by performing switching control on one inverter provided on an other-end side of Y-windings to which a one-end side of each of three-phase windings is connected. A system using open-end windings and two inverters can increase line-to-line voltage of alternating-current voltage of the windings compared to a system using Y-windings and one inverter at the same direct-current voltage, and can allow a rotating electrical machine to operate at higher output.

The Introduction of the paper by V. Oleschuk et al. describes that by making the phases of carrier signals for generating pulses for performing switching control on the two inverters different from each other, the magnitude of ripple of current flowing through the windings can be reduced. V. Oleschuk et al. further mention that by generating pulses by a synchronous scheme instead of an asynchronous scheme using a carrier signal, more suitable control can be performed also for medium/high output applications. Note, however, that in both the asynchronous scheme and the synchronous scheme, switching control is performed on the two inverters by the same control scheme.

It is desirable to determine a switching control scheme based on various elements (operating conditions) such as torque, rotational speed, and voltage on a direct-current side required for the rotating electrical machine, so that operation with higher system efficiency can be performed. In addition, the rotating electrical machine may often generate audible noise, and in such a case, an attempt is made to move noise frequency out of an audio-frequency band by adjusting switching frequency, etc. That is, it is preferable to determine a switching control scheme according to operating conditions so that both of operation with high system efficiency and a reduction in audible noise can be achieved. Although the technique of V. Oleschuk et al. is an excellent technique, there is still room for improvement in appropriate control of the two inverters provided at respective both ends of the open-end windings.

CITATIONS LIST

Patent Literature

Non-Patent Literature 1: V. Oleschuk, R. Bojoi, G. Griva, F. Profumo, "Dual Inverter-Fed Traction Drive with DC Sources Power Balancing Based on Synchronized PWM", Conference Paper/June 2007, 1-4244-0743-5/07, IEEE, p. 260-265

SUMMARY OF THE DISCLOSURE

Technical Problems

In view of the above-described background, it is desired to provide a technique for appropriately controlling two inverters provided at respective both ends of open-end windings.

Solutions to Problems

In a rotating electrical machine control device that considers the above description and that controls drive of a rotating electrical machine having multiphase open-end windings through a first inverter and a second inverter, the multiphase open-end windings being independent of each other, in one aspect, the first inverter is connected to a one-end side of the multiphase open-end windings to convert electric power between direct current and multiphase alternating current, the second inverter is connected to an other-end side of the multiphase open-end windings to convert electric power between direct current and multiphase alternating current, the first inverter and the second inverter can be controlled by a plurality of control schemes, respectively, the control schemes differing from each other in at least one of a switching pattern and a switching frequency and being independent of each other, a first speed region in which rotational speed of the rotating electrical machine is relatively low at same torque and a second speed region in which rotational speed of the rotating electrical machine is higher than in the first speed region are set as control regions of the rotating electrical machine, and the rotating electrical machine control device has a control mode in which the first inverter and the second inverter are controlled by a same control scheme in the first speed region, and the first inverter and the second inverter are controlled by different control schemes in the second speed region.

For control schemes for controlling the inverters, there are known various schemes set based on operating conditions such as the rotational speed, torque, etc., of the rotating electrical machine. By controlling the first inverter and the second inverter by control schemes which are independent of each other, the two inverters can be flexibly controlled according to the operating conditions of the rotating electrical machine. Furthermore, by providing a control mode in which the first inverter and the second inverter are controlled by different control schemes, flexibility in control increases and drive of the rotating electrical machine can be controlled with high efficiency according to the operating conditions of the rotating electrical machine.

Meanwhile, when switching control is performed on the inverters, a ripple component superimposed on an alternating-current fundamental may generate audio-frequency band noise. Particularly, when the rotational speed of the rotating electrical machine is low, the possibility of inclusion of the frequency of a ripple component (or sideband frequencies thereof) in an audio-frequency band increases. In addition, when the two inverters are controlled by different control schemes, respectively, a ripple according to each control scheme may occur, which may increase audio-frequency band noise. By controlling the first inverter and the second inverter by the same control scheme in the first speed region in which the rotational speed of the rotating electrical machine is relatively low, an increase in audio-frequency band noise can be suppressed. In addition, in the two inverters that allow currents to flow through the open-end windings, the phases of the currents differ by substantially 180 degrees from each other. When the two inverters are controlled by the same control scheme, the phases of currents including ripple components differ by substantially 180 degrees from each other. Therefore, at least some of the ripple components can cancel each other out and audio-frequency band noise can also be reduced.

According to this configuration, a control mode is provided in which the first inverter and the second inverter are controlled by the same control scheme in the first speed region and the first inverter and the second inverter are controlled by different control schemes in the second speed region in which the rotational speed of the rotating electrical machine is higher than in the first speed region. Therefore, when the rotational speed of the rotating electrical machine is relatively low, audio-frequency band noise is suppressed, and when the rotational speed of the rotating electrical machine is relatively high, drive of the rotating electrical machine can be controlled with high efficiency according to the operating conditions of the rotating electrical machine. Namely, according to this configuration, the two inverters provided at respective both ends of the open-end windings can be appropriately controlled.

Further features and advantages of the rotating electrical machine control device will become apparent from the following description of an embodiment which will be described with reference to drawings.

DESCRIPTION OF EMBODIMENTS

Figure 1:
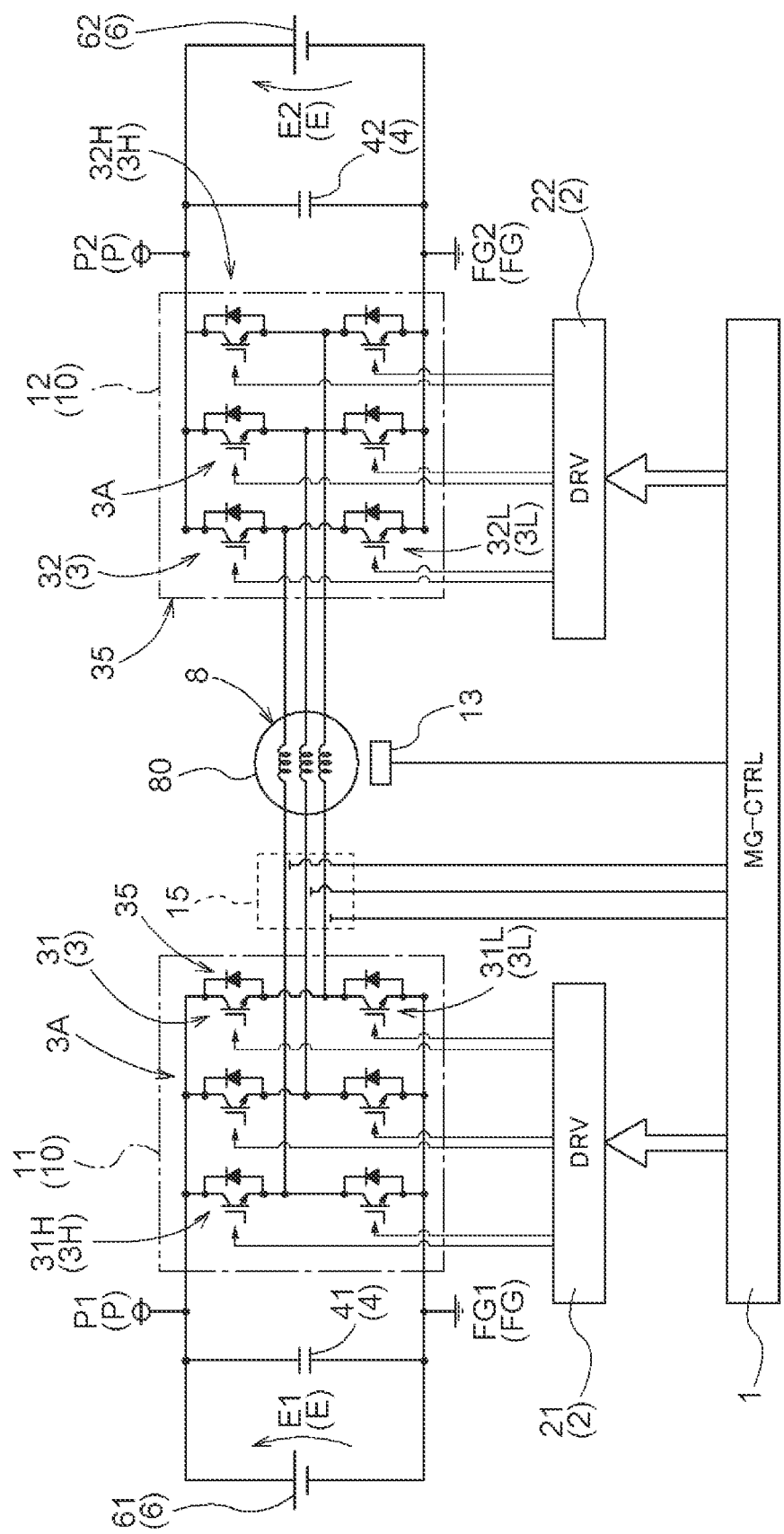
FIG. 1 is a schematic block diagram of a rotating electrical machine drive system.

An embodiment of a rotating electrical machine control device that controls drive of a rotating electrical machine having multiphase open-end windings which are independent of each other through two inverters will be described below based on the drawings. FIG. 1 is a schematic block diagram of a rotating electrical machine drive system including a rotating electrical machine control device 1 (MG-CTRL). A rotating electrical machine 80 serves as, for example, a drive power source for wheels of a vehicle such as an electric vehicle or a hybrid vehicle. The rotating electrical machine 80 is an open-end winding type rotating electrical machine having multiphase (three phases in the present embodiment) stator coils 8 (open-end windings) which are independent of each other. Inverters 10 that are controlled independently of each other to convert electric power between direct current and multiphase (here, three phases) alternating current are connected to respective both ends of the stator coils 8. That is, a first inverter 11 (INV1) is connected to a one-end side of the stator coils 8, and a second inverter 12 (INV2) is connected to an other-end side of the stator coils 8. In the following description, when the first inverter 11 and the second inverter 12 do not need to be distinguished from each other, they are simply referred to as the inverters 10.

The inverters 10 each are configured to include a plurality of switching elements 3. For the switching elements 3, insulated gate bipolar transistors (IGBTs) or power metal oxide semiconductor field effect transistors (MOSFETs) are used. FIG. 1 exemplifies a mode in which IGBTs are used as the switching elements 3. The first inverter 11 and the second inverter 12 have the same circuit connection mode, but may be configured using switching elements 3 of the same type or may be configured using switching elements 3 of different types. Though details will be described later, it is preferred, for example, that first switching elements 31 included in the first inverter 11 be Si-IGBTs or Si-MOSFETs and second switching elements 32 included in the second inverter 12 be switching elements whose switching loss upon a transition between an off state and an on state is relatively small compared to Si-IGBTs or Si-MOSFETs, e.g., silicon carbide-metal oxide semiconductor FETs (SiC-MOSFETs), SiC-static induction transistors (SiC-SITs), or gallium nitride-MOSFETs (GaN-MOSFETs).

In the two inverters 10, an arm 3A for one alternating-current phase includes a series circuit of an upper-stage-side switching element 3H and a lower-stage-side switching element 3L. Each switching element 3 includes a freewheeling diode 35 in parallel thereto, with a direction going from a negative polarity FG to a positive polarity P (a direction going from a lower-stage side to an upper-stage side) being a forward direction. In addition, in the present embodiment, the two inverters 10 are connected to direct-current power supplies 6 which are independent of each other. That is, a first floating ground FG1 which is the negative polarity FG of the first inverter 11 and a second floating ground FG2 which is the negative polarity FG of the second inverter 12 are independent of each other. In addition, a direct-current link capacitor 4 (smoothing capacitor) that smooths direct-current voltage is provided between each inverter 10 and a corresponding direct-current power supply 6.

Specifically, a first direct-current link capacitor 41 (first smoothing capacitor) is connected to a direct-current side of the first inverter 11 in which an arm 3A for one alternating-current phase includes a series circuit of a first upper-stage-side switching element 31H and a first lower-stage-side switching element 31L, and the direct-current side is connected to a first direct-current power supply 61 and an alternating-current side of the first inverter 11 is connected to a one-end side of the multiphase stator coils 8, by which electric power is converted between direct current and multiphase alternating current. A second direct-current link capacitor 42 (second smoothing capacitor) is connected to a direct-current side of the second inverter 12 in which an arm 3A for one alternating-current phase includes a series circuit of a second upper-stage-side switching element 32H and a second lower-stage-side switching element 32L, and the direct-current side is connected to a second direct-current power supply 62 and an alternating-current side of the second inverter 12 is connected to an other-end side of the multiphase stator coils 8, by which electric power is converted between direct current and multiphase alternating current.

In the present embodiment, the first direct-current power supply 61 and the second direct-current power supply 62 are direct-current power supplies having equal ratings of voltage, etc., and the first direct-current link capacitor 41 and the second direct-current link capacitor are capacitors also having equal ratings of capacitance, etc. The rated voltage of the direct-current power supplies 6 is on the order of 48 volts to 400 volts. The direct-current power supplies 6 are composed of, for example, secondary batteries (batteries) such as nickel-hydrogen batteries or lithium-ion batteries, or electric double-layer capacitors. The rotating electrical machine 80 can function as both an electric motor and a generator. The rotating electrical machine 80 converts electric power from the direct-current power supplies 6 into mechanical power through the inverters 10 (motoring). Alternatively, the rotating electrical machine 80 converts rotary drive power transmitted from the wheels, etc., into electric power and charges the direct-current power supplies 6 through the inverters 10 (regeneration).

As shown in FIG. 1, the inverters 10 are controlled by the rotating electrical machine control device 1. The rotating electrical machine control device 1 is constructed using a logic circuit such as a microcomputer as a core member. For example, the rotating electrical machine control device 1 controls the rotating electrical machine 80 through the inverters 10 by performing current feedback control that uses a vector control method, based on a target torque of the rotating electrical machine 80 which is provided from another control device, etc., such as a vehicle control device which is not shown. There are a plurality of control schemes for the inverters 10 such as torque control, current control, and voltage control, but in the present embodiment the inverters 10 are controlled by voltage control.

Actual current flowing through the stator coil 8 of each phase of the rotating electrical machine 80 is detected by a current sensor 15, and a magnetic pole position at each time point of a rotor of the rotating electrical machine 80 is detected by a rotation sensor 13 such as a resolver. The rotating electrical machine control device 1 performs current feedback control using results of the detection by the current sensor 15 and the rotation sensor 13. The rotating electrical machine control device 1 is configured to include various functional parts for current feedback control, and each functional part is implemented by cooperation of hardware such as a microcomputer and software (program).

As shown in FIG. 1, a control terminal of each switching element 3 (a gate terminal in a case of an IGBT or a FET) included in the inverters 10 is connected to the rotating electrical machine control device 1 through a drive circuit 2 (DRV), and switching control of the switching elements 3 is individually performed. High-voltage system circuits for driving the rotating electrical machine 80 such as the inverters 10 (systems connected to the direct-current power supplies 6) and low-voltage system circuits such as the rotating electrical machine control device 1 that uses a microcomputer, etc., as a core (systems with an operating voltage on the order of 3.3 volts to 5 volts) significantly differ from each other in operating voltage (the power supply voltage of the circuits). The drive circuits 2 each improve driving capabilities (e.g., capabilities to allow a circuit at a subsequent stage to operate, such as voltage amplitude and output current) of a drive signal (switching control signal) for each switching element 3, and relay the drive signal. A first drive circuit 21 relays switching control signals to the first inverter 11, and a second drive circuit 22 relays switching control signals to the second inverter 12.

The rotating electrical machine control device 1 has two control modes, e.g., pulse width modulation (PWM) control and rectangular-wave control (single-pulse control (1-Pulse)), as switching pattern modes (modes of voltage waveform control) of the switching elements 3 included in the first inverter 11 and the second inverter 12.

Pulse width modulation has schemes such as continuous pulse width modulation (continuous PWM: CPWM), e.g., sinusoidal pulse width modulation (sinusoidal PWM: SPWM) and space vector pulse width modulation (space vector PWM: SVPWM), and discontinuous pulse width modulation (discontinuous PWM: DPWM). In the discontinuous pulse width modulation, for example, the signal level of an inverter switching control signal for one phase among three-phase alternating-current electric power is sequentially fixed, and the signal levels of switching control signals for the other two phases are changed. In the continuous pulse width modulation, all phases are modulated without thus fixing a switching control signal for any one of the phases. These modulation schemes are determined according to operating conditions such as rotational speed and torque required for the rotating electrical machine 80, and a modulation index (a ratio of a root-mean-square value of three-phase alternating-current phase-to-phase voltage to a root-mean-square value of direct-current voltage) required to satisfy the operating conditions.

Figure 4:
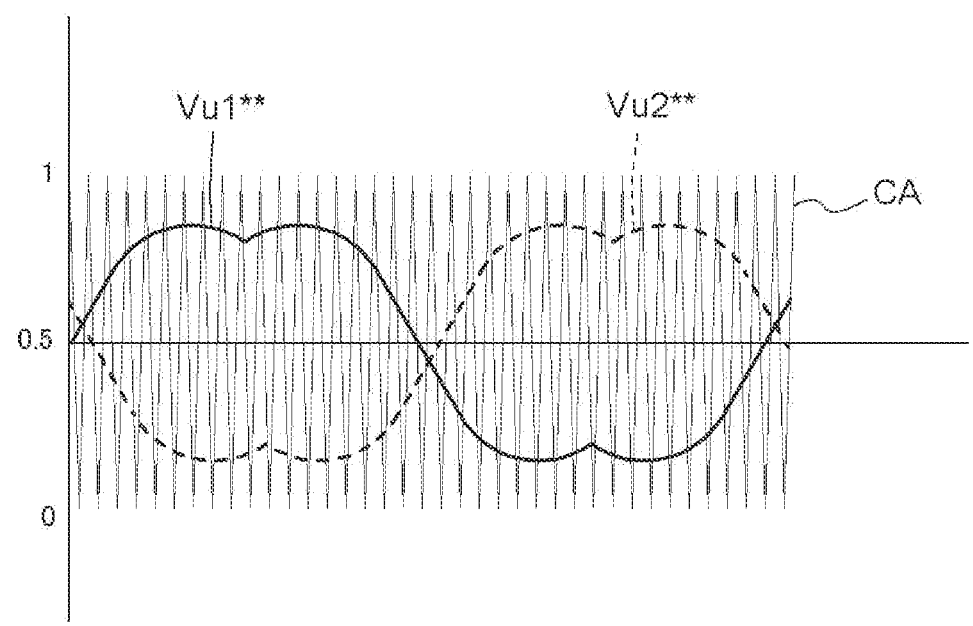
FIG. 4 is a waveform diagram showing an example of U-phase voltage instructions in a first control mode (mode1).

In pulse width modulation, pulses are generated based on a magnitude relationship between the amplitude of an alternating-current waveform (e.g., alternating-current voltage waveform) which is an output instruction and the amplitude of a waveform of a triangle wave (including sawtooth wave) carrier (see FIG. 4, etc.). There is also a case in which a PWM waveform is directly generated by digital computation instead of a comparison with the carrier, but in that case, too, the amplitude of an alternating-current waveform which is an instruction value and the amplitude of a virtual carrier waveform have a correlation.

In pulse width modulation by digital computation, a carrier is determined, for example, according to a control cycle of the rotating electrical machine control device 1 such as a computation cycle of the microcomputer or a duty cycle of an electronic circuit. That is, even when multiphase alternating-current electric power is used to drive the alternating-current rotating electrical machine 80, a carrier has a cycle that is not constrained by (a cycle that is not synchronized with) the rotational speed or rotational angle (electrical angle) of the rotating electrical machine 80. Therefore, both the carrier and each pulse generated based on the carrier are not synchronized with the rotation of the rotating electrical machine 80. Therefore, modulation schemes such as sinusoidal pulse width modulation and space vector pulse width modulation may be referred to as asynchronous modulation. On the other hand, a modulation scheme in which pulses are generated in synchronization with the rotation of the rotating electrical machine 80 is referred to as synchronous modulation. For example, in rectangular-wave control (rectangular-wave modulation), since one pulse is outputted per electrical angle cycle of the rotating electrical machine 80, the rectangular-wave modulation is synchronous modulation.

Meanwhile, as an index indicating an index of modulation from direct-current voltage to alternating-current voltage, there is a modulation index indicating a ratio of a root-mean-square value of line-to-line voltage of multiphase alternating-current voltage to a root-mean-square value of direct-current voltage. In general, the maximum modulation index of sinusoidal pulse width modulation is about 0.61 ($\approx 0.612$) and the maximum modulation index of space vector pulse width modulation control is about 0.71 ($\approx 0.707$). A modulation scheme having a modulation index exceeding about 0.71 is referred to as "overmodulation pulse width modulation" as a modulation scheme whose modulation index is higher than normal. The maximum modulation index of the "overmodulation pulse width modulation" is about 0.78. The modulation index "0.78" is a physical (mathematical) limit value for electric power conversion from direct current to alternating current. In the overmodulation pulse width modulation, when the modulation index reaches 0.78, rectangular-wave modulation (single-pulse modulation) in which one pulse is outputted in one electrical angle cycle is performed. In the rectangular-wave modulation, the modulation index is fixed at about 0.78 which is a physical limit value.

The overmodulation pulse width modulation with a modulation index less than 0.78 can be implemented by using the principle of either one of a synchronous modulation scheme and an asynchronous modulation scheme. A representative modulation scheme for the overmodulation pulse width modulation is discontinuous pulse width modulation. The discontinuous pulse width modulation can be implemented by using the principle of either one of a synchronous modulation scheme and an asynchronous modulation scheme. For example, when the synchronous modulation scheme is used, in rectangular-wave modulation, one pulse is outputted in one electrical angle cycle, whereas in discontinuous pulse width modulation, a plurality of pulses are outputted in one electrical angle cycle. When there are a plurality of pulses in one electrical angle cycle, a pulse enabled period decreases accordingly, reducing the modulation index. Therefore, not only a modulation index fixed at about 0.78, but also an arbitrary modulation index less than 0.78 can be implemented by the synchronous modulation scheme. For example, it is also possible to use multi-pulse modulation (Multi-Pulses) such as 9-pulse modulation (9-Pulses) in which nine pulses are outputted in one electrical angle cycle or 5-pulse modulation (5-Pulses) in which five pulses are outputted in one electrical angle cycle.

In addition, the rotating electrical machine control device 1 can perform shutdown control (SDN) or active short-circuit control (ASC) as fail-safe control performed when an abnormality has been detected in the inverters 10 or the rotating electrical machine 80. The shutdown control is control that brings an inverter 10 into an off state by bringing switching control signals for all switching elements 3 included in the inverter 10 into an inactive state. The active short-circuit control is control that brings either one side, the upper-stage-side switching elements 3H of the arms 3A for all of the plurality of phases or the lower-stage-side switching elements 3L of the arms 3A for all of the plurality of phases, into an on state and brings the other side into an off state. Note that a case in which the upper-stage-side switching elements 3H of the arms 3A for all of the plurality of phases are brought into an on state and the lower-stage-side switching elements 3L of the arms 3A for all of the plurality of phases are brought into an off state is referred to as upper-stage-side active short-circuit control. Note also that a case in which the lower-stage-side switching elements 3L of the arms 3A for all of the plurality of phases are brought into an on state and the upper-stage-side switching elements 3H of the arms 3A for all of the plurality of phases are brought into an off state is referred to as lower-stage-side active short-circuit control.

When, as in the present embodiment, the inverters 10 are connected to respective both ends of the stator coils 8, if one inverter 10 is short-circuited by active short-circuit control, then the multiphase stator coils 8 are short-circuited in the one inverter 10. That is, the one inverter 10 serves as a neutral point and the stator coils 8 are Y-connected. Hence, the rotating electrical machine control device 1 can implement a mode in which the open-end winding type rotating electrical machine 80 is controlled through the two inverters 10 and a mode in which the Y-connected rotating electrical machine 80 is controlled through one inverter 10 (one of the inverters 10 that is not subjected to active short-circuit control). Hence, in the present embodiment, active short-circuit control is also included in a control mode that can be selected not only in fail-safe control but also in normal control.

Meanwhile, when vector control is performed on one inverter 10, eight space vectors can be defined depending on the states of the three-phase arms 3A. Specifically, eight space vectors can be defined by a combination of two types of signal levels of switching control signals for the upper-stage-side switching elements 3H for three phases ($2^3=8$). Note that the signal levels of three-phase switching control signals for the lower-stage-side switching elements 3L are complementary signal levels to the respective signal levels of the switching control signals for the upper-stage-side switching elements 3H. Hence, space vectors can be defined by the signal levels of switching control signals for either one of the upper-stage side and the lower-stage side.

When the signal levels of switching control signals for a U-phase, a V-phase, and a W-phase are represented by (UVW) with a high signal level of each switching control signal being "1" and a low signal level being "0", there are eight space vectors: (000), (001), (010), (011), (100), (101), (110), and (111). Note that of the eight space vectors, (000)

and (111) are referred to as zero vectors or null vectors because they have zero phase-to-phase voltage and voltage is not applied to the rotating electrical machine 80, and indicate the same set of coordinates in a d-q-axis vector coordinate system. On the other hand, the other six space vectors are referred to as active vectors, and indicate different sets of coordinates in the d-q-axis vector coordinate system.

When, as shown in FIG. 1, vector control is performed on the two inverters 10, 64 space vectors can be defined by the signal levels of switching control signals for either one of the upper-stage side and the lower-stage side ($2^{(3\cdot2)}=2^6=64$). Of those space vectors, 10 space vectors are null vectors. When the signal levels for the U-phase (U1-phase), the V-phase (V1-phase), and the W-phase (W1-phase) of the first inverter 11 and the signal levels for the U-phase (U2-phase), the V-phase (V2-phase), and the W-phase (W2-phase) of the second inverter 12 are represented by (U1V1W1-U2V2W2), 10 space vectors, (000-000), (001-001), (010-010), (011-011), (100-100), (101-101), (110-110), (111-111), (000-111), and (111-000), are null vectors with zero phase-to-phase voltage. The other 54 space vectors are active vectors having effective magnitudes from the origin (the coordinates of a null vector) to 18 different sets of coordinates in the d-q-axis vector coordinate system.

Figure 2:
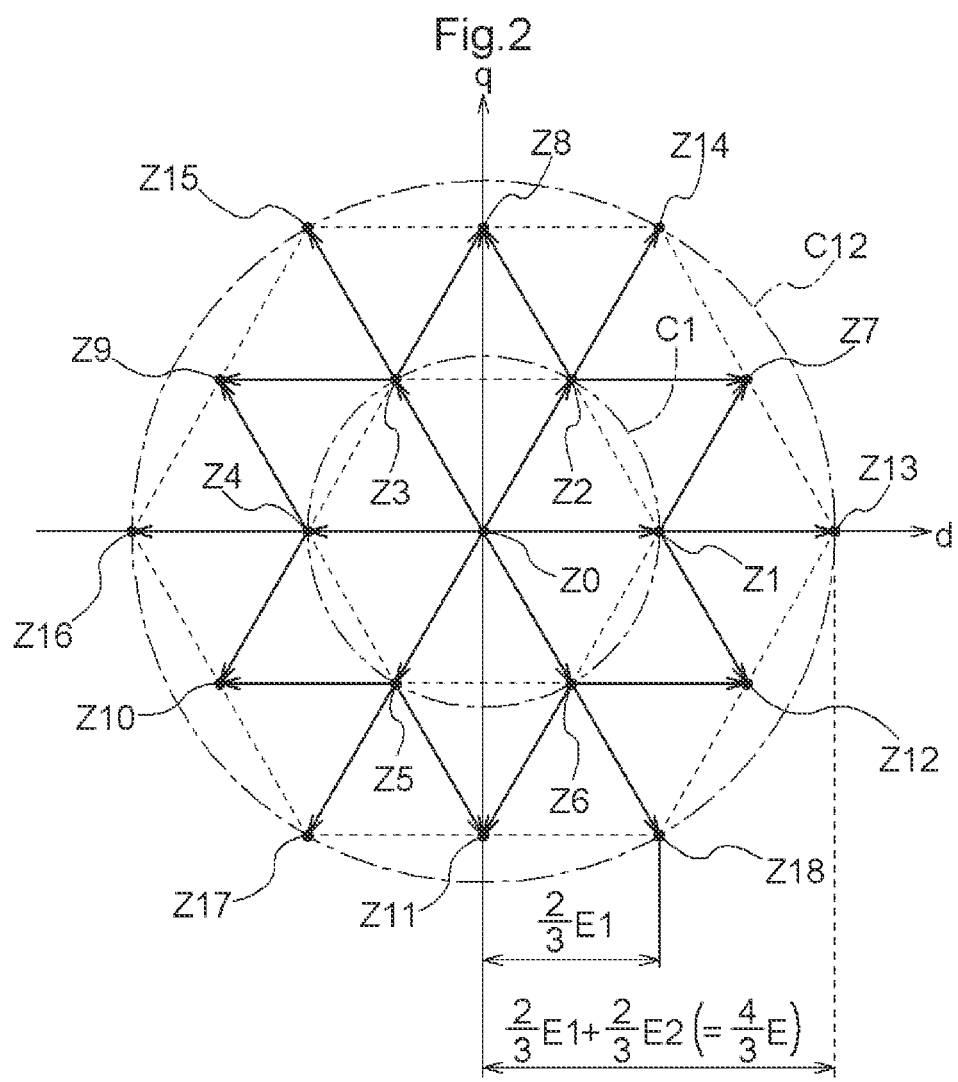
FIG. 2 is a vector diagram of the rotating electrical machine drive system using two inverters.

FIG. 2 plots the coordinates of a null vector and the coordinates of active vectors at 18 points. Z0 indicates the coordinates of a null vector in the d-q-axis vector coordinate system (10 vectors have the same set of coordinates). Z1 to Z6 indicate the coordinates of active vectors implemented by substantially one inverter 10 in the d-q-axis vector coordinate system. Z7 to Z18 indicate coordinates corresponding to active vectors implemented by the two inverters 10 in the d-q-axis vector coordinate system.

Z1 includes (000-011), (100-000), (100-111), and (111-011), Z2 includes (000-001), (110-000), (110-111), and (111-001), Z3 includes (000-101), (010-000), (010-111), and (111-101), Z4 includes (000-100), (011-000), (011-111), and (111-100), Z5 includes (000-110), (001-000), (001-111), and (111-110), and Z6 includes (000-010), (101-000), (101-111), and (111-010). These 24 space vectors each are a combination of a null vector which is a space vector of one inverter 10 and an active vector which is a space vector of the other inverter 10.

Note that 12 space vectors, Z1: (101-001) and (110-010), Z2: (010-011) and (100-101), Z3: (011-001) and (110-100), Z4: (001-101) and (010-110), Z5: (011-010) and (101-100), and Z6: (001-011) and (100-110), also indicate the coordinates of Z1 to Z6. Note, however, that those space vectors each are a combination in which the two inverters 10 both have active vectors instead of one inverter 10 having a null vector.

Z7, Z8, Z9, Z10, Z11, and Z12 correspond to 12 space vectors, i.e., Z7 corresponds to (100-001) and (110-011), Z8 to (010-001) and (110-101), Z9 to (010-100) and (011-101), Z10 to (001-100) and (011-110), Z11 to (001-010) and (101-110), and Z12 to (100-010) and (101-011). In addition, Z13, Z14, Z15, Z16, Z17, and Z18 correspond to six space vectors, i.e., Z13 corresponds to (100-011), Z14 to (110-001), Z15 to (010-101), Z16 to (011-100), Z17 to (001-110), and Z18 to (101-010).

When, as in the present embodiment, drive of the rotating electrical machine 80 having multiphase open-end windings which are independent of each other is controlled through the two inverters 10, generally, switching control is performed on the two inverters 10 by the same control scheme. However, it is desirable to determine a switching control scheme based on various elements (operating conditions) such as torque, rotational speed, and voltage on a direct-current side required for the rotating electrical machine 80, so that operation with higher system efficiency can be performed. Hence, the rotating electrical machine control device 1 has a control mode in which the first inverter 11 and the second inverter 12 are controlled by different control schemes. It has been confirmed by experiments and simulations conducted by the inventors that system efficiency can be increased by providing a control mode in which the first inverter 11 and the second inverter 12 are controlled by different control schemes according to operating conditions of the rotating electrical machine 80.

Meanwhile, when switching control is performed on the inverters 10, a ripple component superimposed on an alternating-current fundamental may generate audio-frequency band noise. When the two inverters 10 are controlled by different control schemes, respectively, a ripple according to each control scheme may occur, which may increase audio-frequency band noise. Particularly, when the rotational speed of the rotating electrical machine 80 is low, the possibility of inclusion of the frequency of a ripple component (or sideband frequencies thereof) in an audio-frequency band increases. It is preferable to appropriately set a control scheme for the rotating electrical machine 80, i.e., control schemes for the inverters 10, according to operating conditions so that both of operation with high system efficiency and a reduction in audible noise can be achieved.

Figure 3:
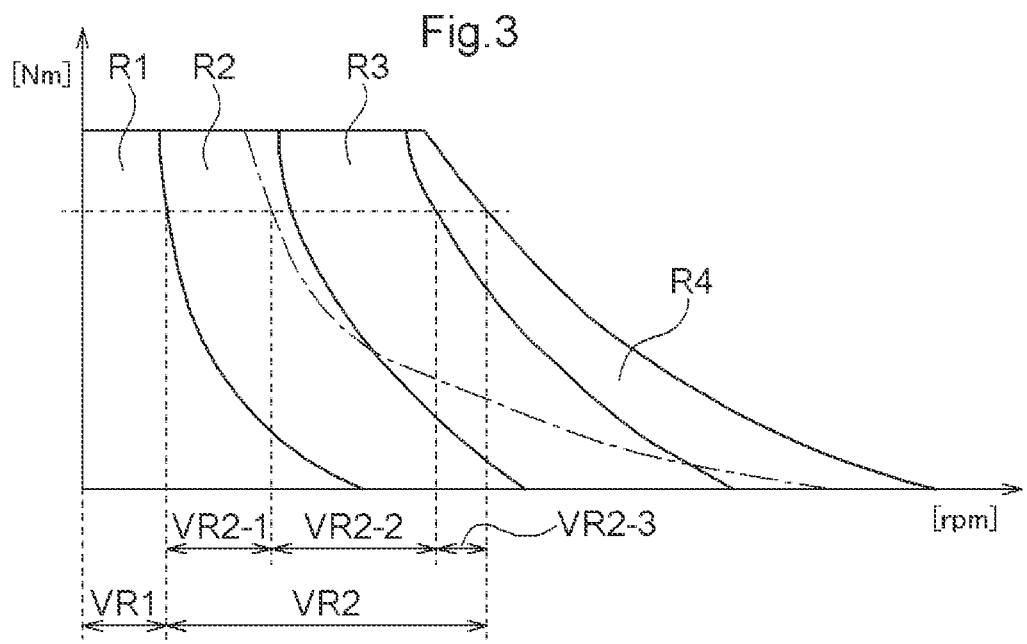
FIG. 3 is a diagram showing an example of control regions in operating regions of a rotating electrical machine.

Hence, in the present embodiment, as shown in FIG. 3, as control regions of the rotating electrical machine 80, a first speed region VR1 in which the rotational speed of the rotating electrical machine 80 is relatively low at the same torque and a second speed region VR2 in which the rotational speed of the rotating electrical machine 80 is higher than in the first speed region VR1 are set, and the rotating electrical machine control device 1 controls the inverters 10 by control schemes appropriate to the respective control regions. FIG. 3 shows a relationship between the rotational speed and torque of the rotating electrical machine 80. The rotating electrical machine control device 1 has a control mode in which the first inverter 11 and the second inverter 12 are controlled by the same control scheme in the first speed region VR1, and the first inverter 11 and the second inverter 12 are controlled by different control schemes in the second speed region VR2.

In the present embodiment, the rotating electrical machine control device 1 roughly has two control modes (a first control mode (mode1) and a second control mode (mode2)) such as those shown in the following table 1. The first control mode is a control scheme performed in the first speed region VR1, and the second control mode is a control scheme performed in the second speed region VR2. As shown in FIG. 3, the second speed region VR2 further has three speed regions (a first high-speed region VR2-1, a second high-speed region VR2-2, and a third high-speed region VR2-3). As shown in table 1, the second control mode has three control modes (mode2-1, mode2-2, and mode2-3) according to the three speed regions. The three control modes will be described later.

TABLE 1

| mode | inv1 | inv2 |
|---|---|---|
| mode1 | PWM (CPWM) | PWM (CPWM) |
| mode2-1 (mode2) | PWM (DPWM) | PWM (CPWM) |

TABLE 1-continued

| mode | inv1 | inv2 |
| --- | --- | --- |
| mode2-2 (mode2) | 1-Pulse | PWM (CPWM/DPWM) |
| mode2-3 (mode2) | 1-Pulse | 1-Pulse |

In the first speed region VR1, the first inverter 11 and the second inverter 12 are controlled by the same control scheme (here, continuous pulse width modulation (CPWM)) (first control mode (mode1)). In the second speed region VR2, a control scheme for each of the first inverter 11 and the second inverter 12 is set according to the rotational speed of the rotating electrical machine 80. In the first high-speed region VR2-1, the first inverter 11 is controlled by discontinuous pulse width modulation (DPWM) and the second inverter 12 is controlled by continuous pulse width modulation (CPWM) (first high-speed region control mode (mode2-1)). In the second high-speed region VR2-2, the first inverter 11 is controlled by rectangular-wave control (1-Pulse) and the second inverter 12 is controlled by pulse width modulation (PWM) which is either one of continuous pulse width modulation (CPWM) and discontinuous pulse width modulation (DPWM) (second high-speed region control mode (mode2-2)). In the third high-speed region VR2-3, the first inverter 11 and the second inverter 12 are controlled by the same control scheme (here, rectangular-wave control (1-Pulse)) (third high-speed region control mode (mode2-3)).

As shown in FIG. 3, as the control regions of the rotating electrical machine 80, the first speed region VR1 in which the rotational speed of the rotating electrical machine 80 is relatively low at the same torque and the second speed region VR2 in which the rotational speed of the rotating electrical machine 80 is higher than in the first speed region VR1 are set. Furthermore, in the second speed region VR2, the first high-speed region VR2-1, the second high-speed region VR2-2, and the third high-speed region VR2-3, from low rotational speed to high rotational speed, are set according to rotational speed at the same torque. In a torque map shown in FIG. 3, an operating region corresponding to the first speed region VR1 is referred to as first region R1, an operating region corresponding to the first high-speed region VR2-1 is referred to as second region R2, an operating region corresponding to the second high-speed region VR2-2 is referred to as third region R3, and an operating region corresponding to the third high-speed region VR2-3 is referred to as fourth region R4.

The first region R1 is an operating region with the lowest rotational speed and the lowest torque. In such an operating region with the lowest rotational speed and the lowest torque, audio-frequency band noise is likely to stand out. Therefore, the rotating electrical machine control device 1 controls the first inverter 11 and the second inverter 12 by the same control scheme. When the two inverters 10 are controlled by different control schemes, respectively, a ripple according to each control scheme may occur, which may increase audio-frequency band noise. However, by controlling the first inverter 11 and the second inverter 12 by the same control scheme in the first speed region VR1 (first region R1) in which audio-frequency band noise is likely to be generated, an increase in audio-frequency band noise can be suppressed. In addition, in the two inverters 10 that allow currents to flow through the stator coils 8, the phases of the currents differ by substantially 180 degrees from each other. When the two inverters 10 are controlled by the same control scheme, the phases of currents including ripple components differ by substantially 180 degrees from each other. Therefore, at least some of the ripple components can cancel each other out and audio-frequency band noise can also be reduced.

The second region R2 is an operating region with a higher rotational speed and a higher torque than the first region R1, but is an operating region with a lower rotational speed and a lower torque than the third region R3 and the fourth region R4. That is, the second region R2 is an operating region with a relatively low rotational speed and a relatively low torque in all operating regions and thus does not require a high modulation index. Hence, both the first inverter 11 and the second inverter 12 are controlled by pulse width modulation. Note, however, that since the second region R2 is an operating region with a higher rotational speed and a higher torque than the first region R1, as shown in table 1, in the present embodiment, a mode is exemplified in which the first inverter 11 is controlled by discontinuous pulse width modulation (DPWM) that allows modulation with a higher modulation index than continuous pulse width modulation (CPWM), and the second inverter 12 is controlled by continuous pulse width modulation (CPWM).

The third region R3 is an operating region with a higher rotational speed and a higher torque than the second region R2, but is an operating region with a lower rotational speed and a lower torque than the fourth region R4. That is, the third region R3 is an operating region with a relatively high rotational speed and a relatively high torque in all operating regions and thus requires a high modulation index. In the present embodiment, as shown in table 1, the first inverter 11 is controlled by rectangular-wave control (1-Pulse) and the second inverter 12 is controlled by pulse width modulation (CPWM or DPWM).

For the pulse width modulation in the third region R3, as shown in table 1, it is preferred to use continuous pulse width modulation (CPWM) or discontinuous pulse width modulation (DPWM) that allows output with a higher modulation index than continuous pulse width modulation. The discontinuous pulse width modulation (DPWM) includes, as described above, asynchronous modulation and synchronous modulation. Since the first inverter 11 is controlled by synchronous modulation (rectangular-wave modulation), by controlling the second inverter 12 by discontinuous pulse width modulation (multi-pulse modulation) which is synchronous modulation, too, it is easy to make the phase of alternating-current voltage of the first inverter 11 and the phase of alternating-current voltage of the second inverter 12 different from each other by 180 degrees. As a matter of course, taking into account continuity with the second region R2, the second inverter 12 may be controlled by discontinuous pulse width modulation which is asynchronous modulation.

Note that the pulse width modulation in the third region R3 may be further changed, as shown in the following table 2, to different control schemes according to operating conditions such as rotational speed. That is, continuous pulse width modulation (CPWM), discontinuous pulse width modulation which is asynchronous modulation, and discontinuous pulse width modulation which is synchronous modulation may be selectively performed according to operating conditions such as rotational speed.

TABLE 2

| mode | inv1 | inv2 |
| --- | --- | --- |
| mode1 | CPWM [asynchronous] | CPWM [asynchronous] |

TABLE 2-continued

| mode | inv1 | inv2 |
|---|---|---|
| mode2-1 (mode2) | DPWM [asynchronous] | CPWM [asynchronous] |
| mode2-2 (mode2) | 1-Pulse [synchronous] | CPWM [asynchronous] DPWM [asynchronous] Multi-Pulses (DPWM) [synchronous] |
| mode2-3 (mode2) | 1-Pulse [synchronous] | 1-Pulse [synchronous] |

The fourth region R4 is an operating region with the highest rotational speed and the highest torque. As shown in tables 1 and 2, in the fourth region R4, the two inverters 10 are both controlled by rectangular-wave control (1-Pulse).

In the above description, a mode is exemplified in which the rotating electrical machine control device 1 sets a control scheme for each of the first inverter 11 and the second inverter 12 in the second speed region VR2, according to the rotational speed of the rotating electrical machine 80. However, the rotating electrical machine control device 1 may set a control scheme for each of the first inverter 11 and the second inverter 12 in the second speed region VR2, according to a ratio of a root-mean-square value of multiphase alternating-current electric power to a root-mean-square value of direct-current electric power (modulation index). In addition to the above, the rotating electrical machine control device 1 may set the control schemes based on, for example, output torque from the rotating electrical machine 80. Alternatively, the rotating electrical machine control device 1 may set the control schemes based on three-phase alternating-current electric power, three-phase alternating current, three-phase alternating-current voltage, or the root-mean-square values of these electric power, alternating current, and voltage.

As described above, the rotating electrical machine control device 1 may change each control scheme based on the ratio of a root-mean-square value of three-phase alternating-current electric power to a root-mean-square value of direct-current electric power (e.g., a modulation index (which may be an instruction value or may be an equivalent from output voltage)). In the present embodiment, the terminal-to-terminal voltage "E1" of the first direct-current power supply 61 and the terminal-to-terminal voltage "E2" of the second direct-current power supply 62 are identical (both are voltage "E"). When the root-mean-square value on the alternating-current side of the first inverter 11 is "Va_inv1" and the root-mean-square value on the alternating-current side of the second inverter 12 is "Va_inv2", the modulation index "Mi_inv1" of the first inverter 11" and the modulation index "Mi_inv2" of the second inverter 12 are as shown in the following equations (1) and (2). In addition, the modulation index "Mi_sys" of the entire system is as shown in the following equation (3).

$$Mi\_inv1 = Va\_inv1/E1 = Va\_inv1/E \quad (1)$$

$$Mi\_inv2 = Va\_inv2/E2 = Va\_inv2/E \quad (2)$$

$$Mi\_sys = (Va\_inv1 + Va\_inv2)/(E1 + E2) \quad (3)$$
$$= (Va\_inv1 + Va\_inv2)/2E$$

For the instantaneous value of voltage, an instantaneous vector needs to be considered, but when only the modulation index is simply considered, the modulation index "Mi_sys" of the entire system is "(Mi_inv1+Mi_inv2)/2" from equations (1) to (3).

For example, the first control mode (mode1) shown in tables 1 and 2 is selected when the modulation index "Mi_sys" of the entire system is less than a first reference modulation index M1 (e.g., "0.25"). The first inverter 11 and the second inverter 12 are controlled by continuous pulse width modulation control (CPWM) in a range in which the modulation indices "Mi_inv1" and "Mi_inv2" are less than "0.3", including a margin a (e.g., "0.05") for preventing hunting between control modes.

The first high-speed region control mode (mode2-1) shown in tables 1 and 2 is selected when the modulation index "Mi_sys" of the entire system is greater than or equal to the first reference modulation index M1 (e.g., "0.25") and less than a second reference modulation index M2 (e.g., "0.5"). When the first inverter 11 and the second inverter 12 are controlled by the same control scheme, the first inverter 11 and the second inverter 12 are controlled by continuous pulse width modulation control (CPWM) or discontinuous pulse width modulation control (DPWM) such that the modulation indices "Mi_inv1" and "Mi_inv2" of the two inverters are in a range of "0.25 to 0.5". When, as shown in tables 1 and 2, the first inverter 11 and the second inverter 12 are controlled by different pulse width control schemes, the first inverter 11 is controlled by discontinuous pulse width modulation control (DPWM) and the second inverter 12 is controlled by continuous pulse width modulation control (CPWM) such that the modulation index "Mi_sys" of the entire system is in a range of "0.25 to 0.5" and "Mi_inv1>Mi_inv2". Here, it is assumed, for example, that the maximum value of the modulation index "Mi_inv1" of the first inverter 11 in the second control mode is "0.56" and the maximum value of the modulation index "Mi_inv2" of the second inverter 12 in the second control mode is "0.44". Note that as with the margin α in the first control mode, in order to prevent hunting between control modes, for example, a margin may be set on an upper-limit side of the modulation index range.

The second high-speed region control mode (mode2-2) shown in tables 1 and 2 is selected when the modulation index "Mi_sys" of the entire system is greater than or equal to the second reference modulation index M2 (e.g., "0.5") and less than the maximum modulation index "0.78". Since the first inverter 11 is controlled by rectangular-wave control (1-Pulse), the modulation index "Mi_inv1" of the first inverter 11 is fixed at "0.78". To satisfy the modulation index "Mi_sys" of the entire system, the second inverter 12 is controlled in a range in which the modulation index "Mi_inv2" is greater than or equal to "0.22" and less than "0.78". For example, on a side of this range close to the lower-limit modulation index "0.22", as shown in table 2, the second inverter 12 is controlled by continuous pulse width modulation (CPWM). In addition, on a side of this range close to the upper-limit modulation index "0.78", as shown in table 2, the second inverter 12 is controlled by multi-pulse modulation (Multi-Pulses). At intermediate modulation indices in this range, the second inverter 12 is controlled by asynchronous discontinuous pulse width modulation (DPWM). Note that as with the margin α in the first control mode, in order to prevent hunting between control modes, for example, a margin may be set on a lower-limit side of the modulation index range.

In the third high-speed region control mode (mode2-3) shown in tables 1 and 2, the modulation index "Mi_sys" of the entire system is fixed at the maximum modulation index "0.78". Since both the first inverter 11 and the second inverter 12 are controlled by rectangular-wave control (1-Pulse), the modulation indices "Mi_inv1" and "Mi_inv2" of the two inverters are fixed at "0.78". As such, the rotating electrical machine control device 1 can change the control schemes based on the modulation index (which may be the instruction value of the modulation index or may be an equivalent from output voltage). In the following table 3, categories of the above-described modulation indices are added to the control modes of table 2. Note that "a" and "b" in table 3 are arbitrary values, and it is preferred, for example, that "a" be on the order of "0.3 to 0.5" and "b" be on the order of "0.5 to 0.7".

TABLE 3

| mode | Mi_sys | inv1 | Mi_inv1 | inv2 | Mi_inv2 |
|---|---|---|---|---|---|
| mode1 | M < 0.25 | CPWM | M < 0.3 | CPWM | M < 0.3 |
| mode2-1 | 0.25 ≤ M < 0.5 | DPWM | 0.4 ≤ M < 0.56 | CPWM | 0.1 ≤ M < 0.44 |
| mode2-2 | 0.5 ≤ M < 0.78 | 1-Pulse | M = 0.78 | CPWM | 0.22 ≤ M < a |
|  |  |  |  | DPWM | a ≤ M < b |
|  |  |  |  | Multi-Pulses | b ≤ M < 0.78 |
| mode2-3 | M = 0.78 | 1-Pulse | M = 0.78 | 1-Pulse | M = 0.78 |

Note that the rotating electrical machine control device 1 may change the control schemes based on voltage instructions (a voltage instruction "V1*" for the first inverter 11 and a voltage instruction "V2*" for the second inverter 12) which are indices equivalent to the modulation indices (see voltage instructions Vu**, etc., exemplified in FIG. 4, etc.). For example, the first control mode is selected when the voltage instruction "V1*" for the first inverter 11 and the voltage instruction "V2*" for the second inverter 12 are less than a first voltage instruction reference value (the value of a voltage instruction corresponding to the first reference modulation index M1). The fourth control mode is selected when the voltage instruction "V1*" for the first inverter 11 and the voltage instruction "V2*" for the second inverter 12 have maximum values. Though a detailed description and exemplification are omitted as it is easily understandable by the above description, for the second control mode (the first high-speed region control mode, the second high-speed region control mode, and the third high-speed region control mode), too, likewise, the rotating electrical machine control device 1 can change the control schemes based on voltage instructions.

The first control mode, the first high-speed region control mode, the second high-speed region control mode, and the third high-speed region control mode will be described below mainly for the modes exemplified in table 2, with reference to exemplary waveforms of voltage instructions.

A waveform diagram of FIG. 4 shows an example of a first U-phase voltage instruction Vu1 which is a U-phase voltage instruction for the first inverter 11, a second U-phase voltage instruction Vu2 which is a U-phase voltage instruction for the second inverter 12, and a carrier CA in the first control mode (mode1). In the present embodiment, the carrier CA is a triangle wave with a wave height of "1", i.e., the triangle wave changes between "0" and "1". The voltage instructions change in a range in which the minimum value is greater than "0" and the maximum value is smaller than "1". In sinusoidal pulse width modulation, a voltage instruction has a sine-wave shape, but the maximum modulation index remains at about 0.61. In the present embodiment, since space vector pulse width modulation with a maximum modulation index on the order of about 0.71 is performed, a sine-wave shaped voltage instruction is corrected. The first U-phase voltage instruction Vu1 and the second U-phase voltage instruction Vu2 indicate voltage instructions provided when the first inverter 11 and the second inverter 12 are modulated by continuous pulse width modulation (CPWM).

Figure 5:
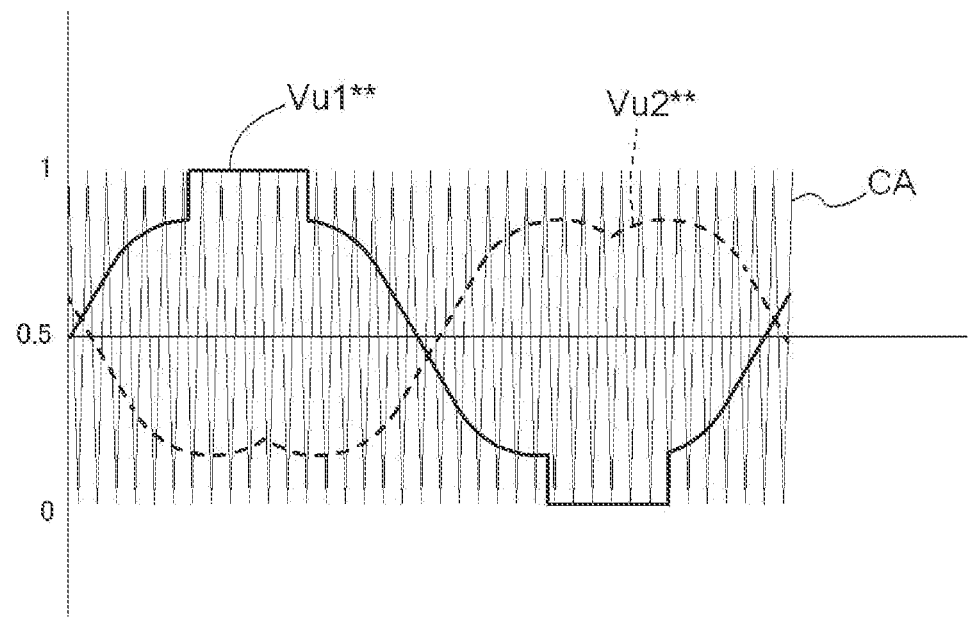
FIG. 5 is a waveform diagram showing an example of U-phase voltage instructions in a first high-speed region control mode (mode2-1).

A waveform diagram of FIG. 5 shows an example of a first U-phase voltage instruction Vu1, a second U-phase voltage instruction Vu2, and a carrier CA in the first high-speed region control mode (mode2-1). The first U-phase voltage instruction Vu1 of FIG. 5 indicates a voltage instruction provided when the first inverter 11 is modulated by discontinuous pulse width modulation (DPWM), and the second U-phase voltage instruction Vu2 indicates a voltage instruction provided when the second inverter 12 is modulated by continuous pulse width modulation (CPWM).

As shown in FIGS. 4 and 5, the first U-phase voltage instruction Vu1 and the second U-phase voltage instruction Vu2 are different in phase by approximately 180 degrees from each other. In a case of the same modulation index, when the vector of current and the vector of voltage of the second inverter 12 point in directions different by 180 degrees from each other on the same straight line, the power factor of the second inverter 12 is "1". As a result, the second inverter 12 operates with high efficiency, enabling to optimize system loss.

The maximum amplitude of U-phase voltage is "(4/3)E" (see also the vector diagram of FIG. 2) and the maximum amplitude of phase-to-phase voltage is "2E". Note that the first direct-current power supply 61 and the second direct-current power supply 62 are independent of each other, and first direct-current voltage E1 of the first direct-current power supply 61 and second direct-current voltage E2 of the second direct-current power supply 62 may have different values. For example, to be precise, the maximum amplitude of U-phase voltage is "((2/3)E1)+(2/3)E2", but in this specification also including the following description, description is made assuming that "E1=E2=E".

Figure 6:
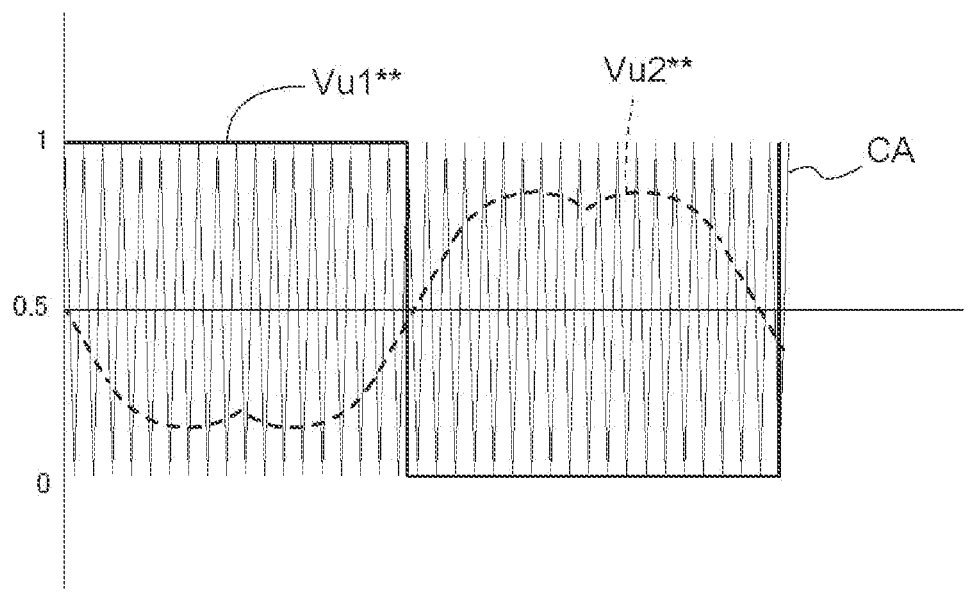
FIG. 6 is a waveform diagram showing an example of U-phase voltage instructions in a second high-speed region control mode (mode2-2).
Figure 7:
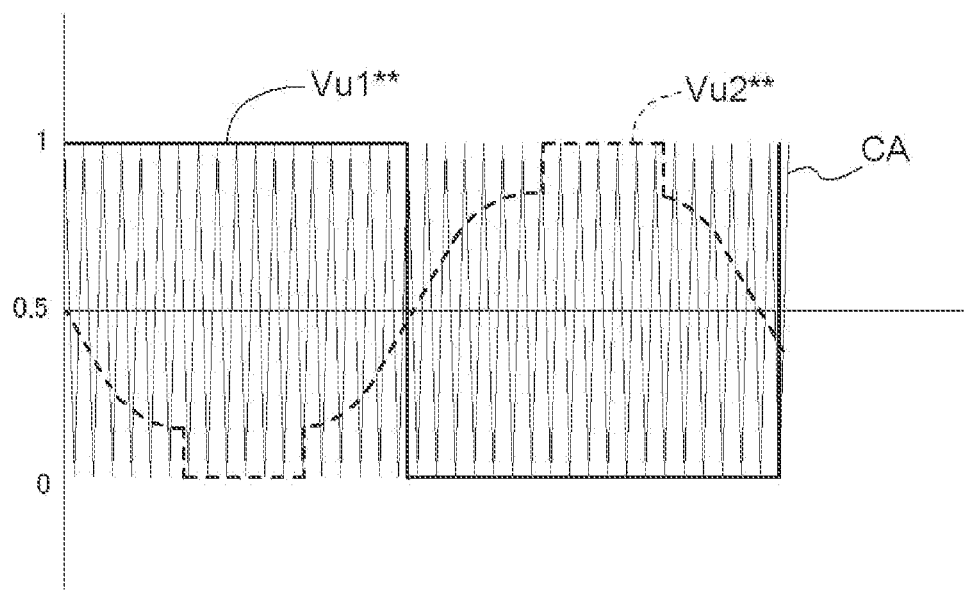
FIG. 7 is a waveform diagram showing another example of U-phase voltage instructions in the second high-speed region control mode (mode2-2).

Waveform diagrams of FIGS. 6 and 7 show examples of a first U-phase voltage instruction Vu1, a second U-phase voltage instruction Vu2, and a carrier CA in the second high-speed region control mode (mode2-2). In the second high-speed region control mode, since rectangular-wave control is performed on the first inverter 11, the first U-phase voltage instruction Vu1 also has a rectangular-wave shape. FIG. 6 exemplifies a voltage instruction provided when the second U-phase voltage instruction Vu2 is continuous pulse width modulation (CPWM) such as space vector pulse width modulation (SVPWM). FIG. 7 exemplifies a voltage instruction provided when the second U-phase voltage instruction Vu2** is discontinuous pulse width modulation (DPWM) which is asynchronous modulation. Though not shown, as described above, the second inverter 12 may be controlled by discontinuous pulse width modulation (multi-pulse modulation (Multi-Pulses)) which is synchronous modulation. Note that when synchronous modulation is performed on both the first inverter 11 and the second inverter 12, the carrier CA is not necessary.

In the second high-speed region control mode, too, as with the first control mode and the first high-speed region control mode, the maximum amplitude of U-phase voltage is "(4/3)E" and the maximum amplitude of phase-to-phase voltage is "2E".

Figure 8:
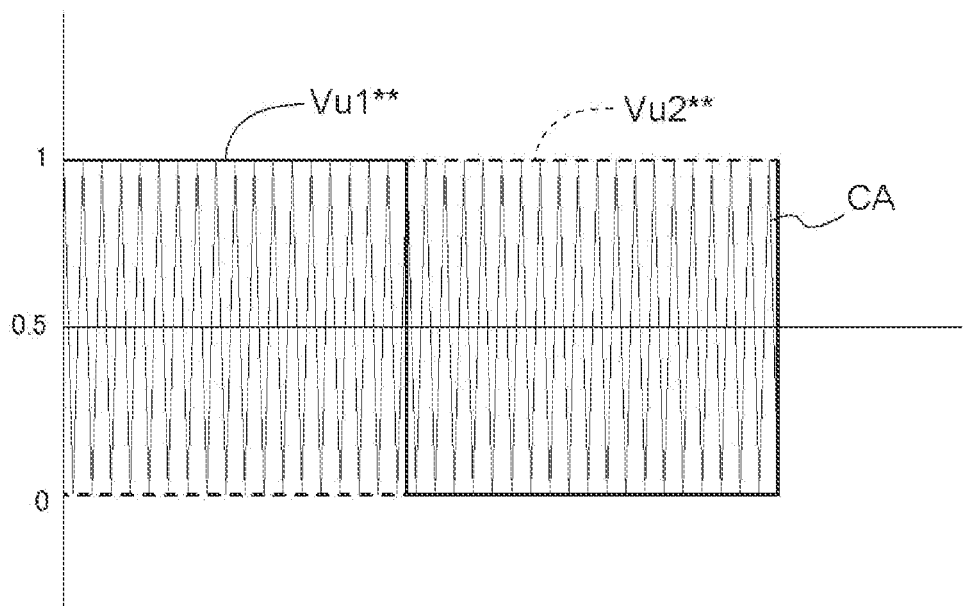
FIG. 8 is a waveform diagram showing an example of U-phase voltage instructions in a third high-speed region control mode (mode2-3).

A waveform diagram of FIG. 8 shows an example of a first U-phase voltage instruction Vu1 which is a U-phase voltage instruction for the first inverter 11, a second U-phase voltage instruction Vu2 which is a U-phase voltage instruction for the second inverter 12, and a carrier CA in the second high-speed region control mode (mode2-3). In the fourth control mode, since rectangular-wave control is performed on the second inverter 12, too, in addition to the first inverter 11, both the first U-phase voltage instruction Vu1 and the second U-phase voltage instruction Vu2 have a rectangular-wave shape. Note that when rectangular-wave modulation (synchronous modulation) is performed on both the first inverter 11 and the second inverter 12, the carrier CA is not necessary, but for easy comparison of the modulation indices, etc., with the first control mode, the first high-speed region control mode, and the second high-speed region control mode, the carrier CA is also shown.

Figure 9:
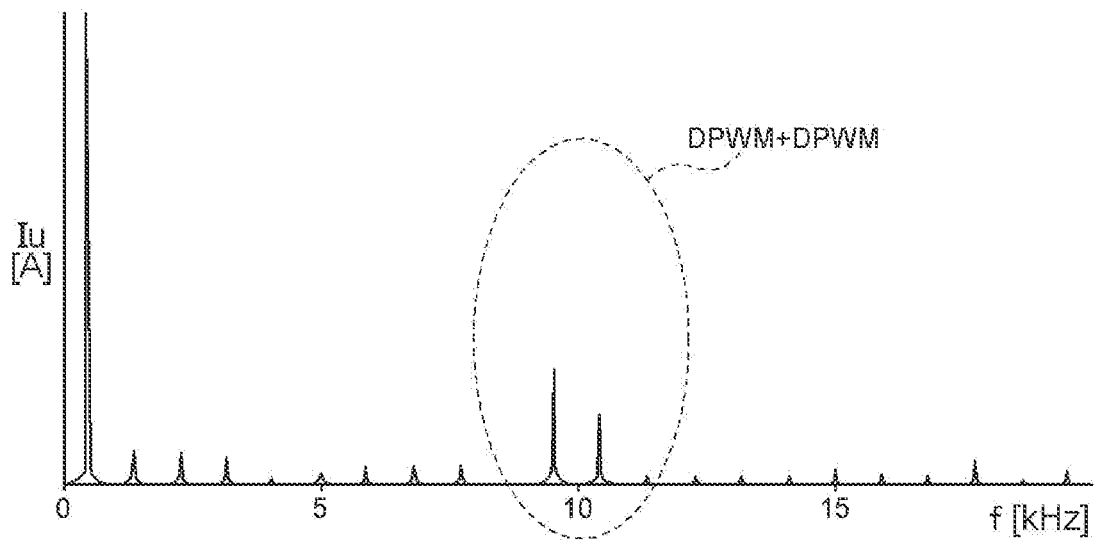
FIG. 9 is a graph showing an example of frequency characteristics of noise for a case in which the two inverters are controlled by the same control scheme.
Figure 10:
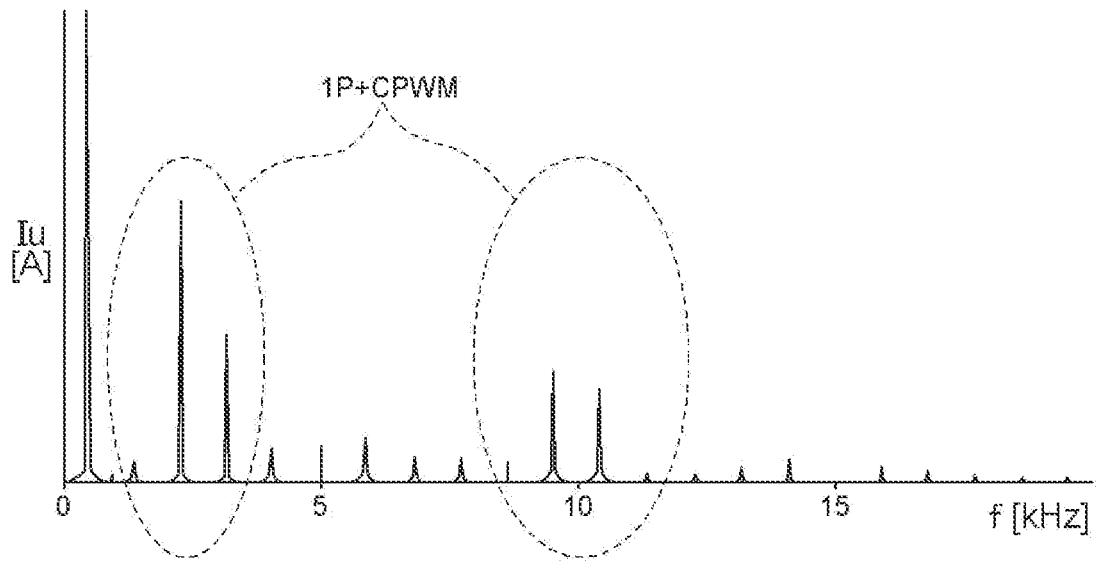
FIG. 10 is a graph showing an example of frequency characteristics of noise for a case in which the two inverters are controlled by different control schemes.

Now, with reference also to FIGS. 9 to 12, audio-frequency band noise will be described. FIGS. 9 and 10 show noise frequency distributions (simulation results) obtained when the inverters 10 are controlled by the same control scheme under the same operating conditions (rotational speed, torque, direct-current link voltage, etc.) (FIG. 9) and obtained when the inverters 10 are controlled by different control schemes under the same operating conditions (FIG. 10). FIG. 9 exemplifies a case in which the two inverters 10 are both controlled by discontinuous pulse width modulation (DPWM), and FIG. 10 exemplifies a mode in which one inverter 10 is controlled by rectangular-wave control (1-Pulse) and the other inverter 10 is controlled by continuous pulse width modulation (CPWM).

Figure 11:
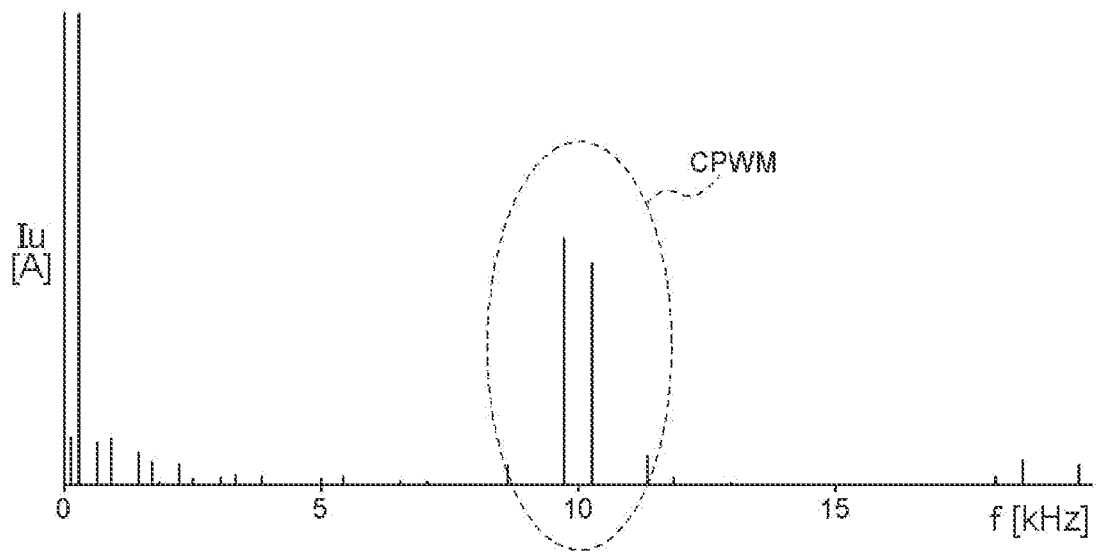
FIG. 11 is a graph showing another example of frequency characteristics of noise for a case in which the two inverters are controlled by the same control scheme.
Figure 12:
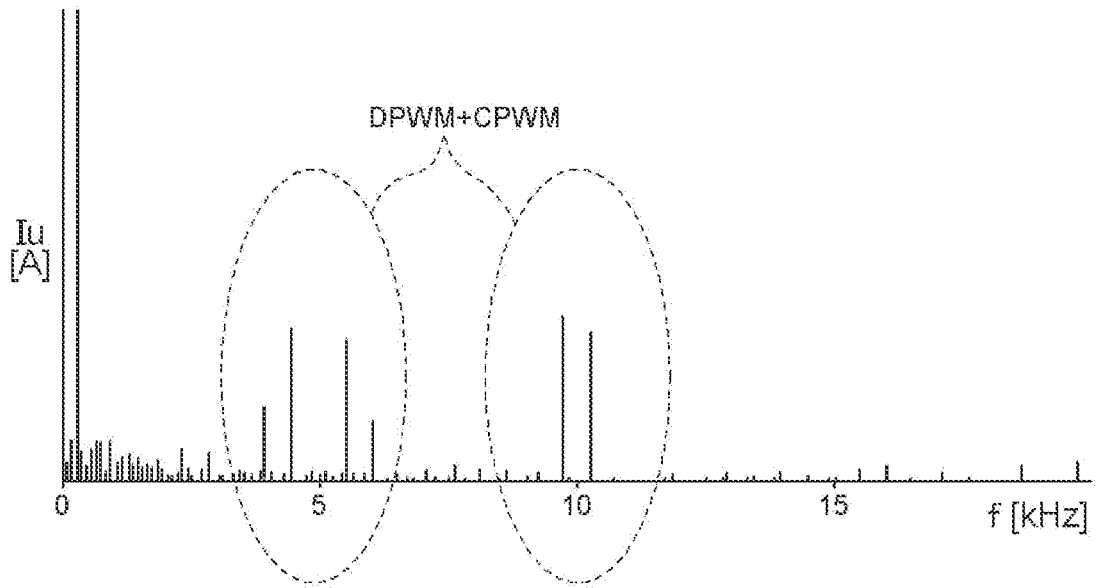
FIG. 12 is a graph showing another example of frequency characteristics of noise for a case in which the two inverters are controlled by different control schemes.

Likewise, FIGS. 11 and 12 show noise frequency distributions obtained when the inverters 10 are controlled by the same control scheme under the same operating conditions (rotational speed, torque, and direct-current link voltage) (FIG. 11) and obtained when the inverters 10 are controlled by different control schemes under the same operating conditions (FIG. 12). FIG. 11 exemplifies a case in which the two inverters 10 are both controlled by continuous pulse width modulation (CPWM), and FIG. 12 exemplifies a mode in which one inverter 10 is controlled by discontinuous pulse width modulation (DPWM) and the other inverter 10 is controlled by continuous pulse width modulation (CPWM). Note that the rotational speed, voltage on the direct-current side, and carrier frequency (here, 5 [kHz]) of the rotating electrical machine 80 are the same in all FIGS. 9 to 12. The torque of the rotating electrical machine 80 is higher in FIGS. 11 and 12 than in FIGS. 9 and 10 and is about 1.7x.

As is clear by comparing FIGS. 9 and 10, when the inverters 10 are controlled by different control schemes (FIG. 10), high noise is generated on a lower frequency side than 5 [kHz] and around 10 [kHz]. When the inverters 10 are controlled by the same control scheme (FIG. 9), noise on a lower frequency side than 5 [kHz] is suppressed. Namely, when the inverters 10 are controlled by the same control scheme, noise in an audio-frequency band (which is said to be approximately 10 [Hz] to 20 [kHz]) is suppressed compared to when the inverters 10 are controlled by different control schemes.

Likewise, as is clear by comparing FIGS. 11 and 12, when the inverters 10 are controlled by different control schemes (FIG. 12), high noise is generated around 5 [kHz] and around 10 [kHz]. When the inverters 10 are controlled by the same control scheme (FIG. 11), noise around 5 [kHz] is suppressed. Namely, when the inverters 10 are controlled by the same control scheme, audio-frequency band noise is suppressed compared to when the inverters 10 are controlled by different control schemes. Note that the peak value of noise around 10 [kHz] is on the order of approximately 20% lower when the inverters 10 are controlled by different control schemes (FIG. 12).

As described above, the rotating electrical machine control device 1 has a control mode in which the first inverter 11 and the second inverter 12 are controlled by the same control scheme in the first speed region VR1, and the first inverter 11 and the second inverter 12 are controlled by different control schemes in the second speed region VR2. By this, when the rotational speed of the rotating electrical machine 80 is relatively low, audio-frequency band noise is suppressed, and when the rotational speed of the rotating electrical machine 80 is relatively high, drive of the rotating electrical machine 80 can be controlled with high efficiency according to the operating conditions of the rotating electrical machine 80.

Meanwhile, in the operating regions of the rotating electrical machine 80 shown in FIG. 3, a dash-dotted line indicates an operating region that can be implemented using one inverter 10. The entire first region R1 is included in the operating region that can be implemented using one inverter 10. As described above, when the inverters 10 are connected to respective both ends of the stator coils 8, if one inverter 10 is short-circuited by active short-circuit control, then the multiphase stator coils 8 are short-circuited in the one inverter 10. That is, the rotating electrical machine control device 1 can substantially drive the rotating electrical machine 80 through one inverter 10 (one of the inverters 10 that is not subjected to active short-circuit control). In the first region R1, the rotating electrical machine 80 can be driven by allowing one inverter 10 to be short-circuited by active short-circuit control, and performing switching control on the other inverter 10.

For example, when the first region R1 includes a region in which audio-frequency band noise is problematic and a region in which audio-frequency band noise is not problematic, both inverters 10 are controlled by the same control scheme in the region in which audio-frequency band noise is problematic, and active short-circuit control can be performed on one inverter 10 in the region in which audio-frequency band noise is not problematic. When the rotating electrical machine 80 is a drive power source of an automobile, the region in which audio-frequency band noise is problematic and the region in which audio-frequency band noise is not problematic may be able to be distinguished from each other according to driving modes and operating conditions (rotational speed and torque). Here, the driving modes include an urban area travel mode, an expressway travel mode, etc.

Figure 13:
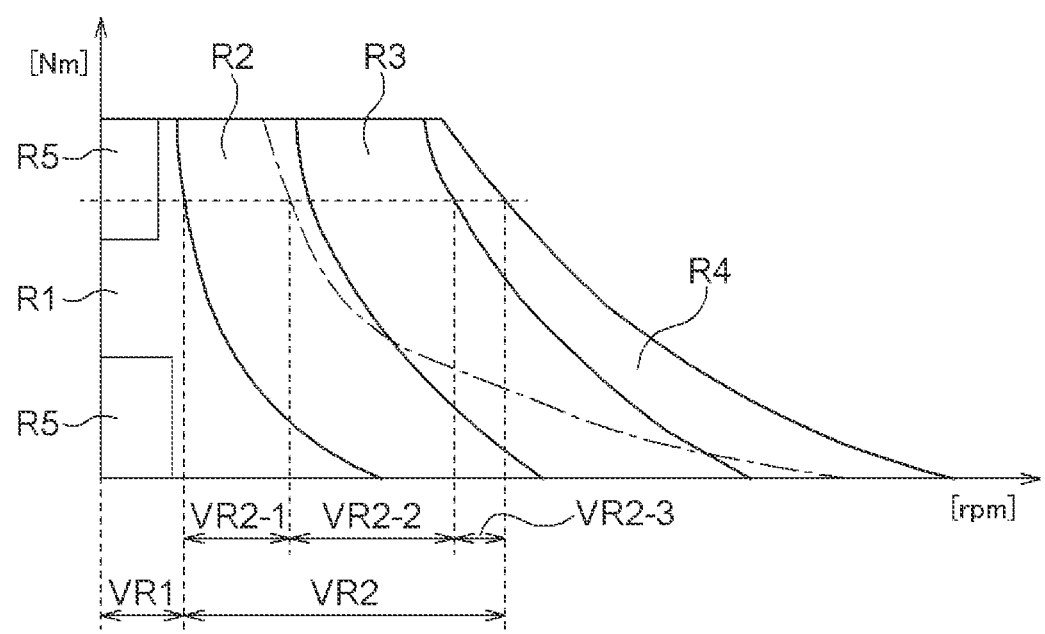
FIG. 13 is a diagram showing another example of control regions in operating regions of the rotating electrical machine.

FIG. 13 shows an example in which fifth regions R5 are set in the first region R1 of FIG. 3. In the fifth regions R5, the rotating electrical machine control device 1 controls drive of the rotating electrical machine 80 by, for example, the first control mode in which the second inverter 12 is brought into a short-circuited state by active short-circuit control and pulse width modulation control is performed on the first inverter 11. As shown in the following table 4, the first control mode (mode1) can include a first low-speed region control mode (mode1-1) and a second low-speed region control mode (mode1-2).

TABLE 4

| mode | inv1 | inv2 |
| --- | --- | --- |
| mode1-1 (mode1) | PWM (CPWM) | PWM (CPWM) |
| mode1-2 (mode1) | PWM (CPWM) | ASC |
| mode2-1 (mode2) | PWM (DPWM) | PWM (CPWM) |
| mode2-2 (mode2) | 1-Pulse | PWM (CPWM/DPWM) |
| mode2-3 (mode2) | 1-Pulse | 1-Pulse |

By this, when the rotational speed of the rotating electrical machine 80 is relatively low and audible noise is problematic, audio-frequency band noise is suppressed, and when, even if the rotational speed of the rotating electrical machine 80 is relatively low, audible noise is not problematic and when the rotational speed of the rotating electrical machine 80 is relatively high, drive of the rotating electrical machine 80 can be controlled with high efficiency according to the operating conditions of the rotating electrical machine 80.

Figure 14:
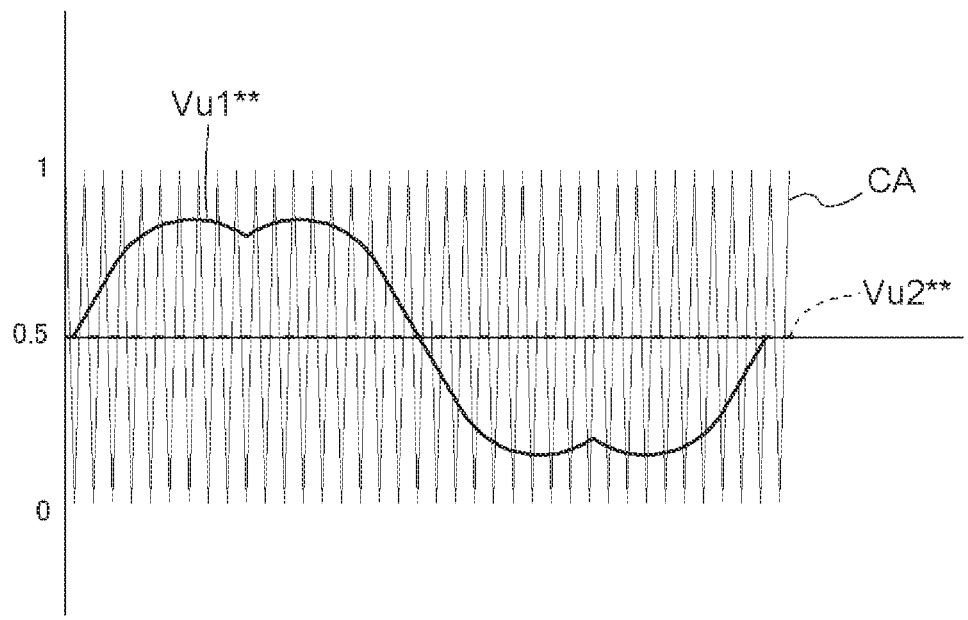
FIG. 14 is a waveform diagram showing an example of U-phase voltage instructions in a second low-speed region control mode (model-2).

A waveform diagram of FIG. 14 shows an example of a first U-phase voltage instruction Vu1 which is a U-phase voltage instruction for the first inverter 11, a second U-phase voltage instruction Vu2 which is a U-phase voltage instruction for the second inverter 12, and a carrier CA used upon pulse width modulation, in the second low-speed region control mode (mode2-2). The second U-phase voltage instruction Vu2** for the second inverter 12 which is subjected to active short-circuit control is zero. In the second low-speed region control mode (mode2-2), only the first inverter 11 functions as an inverter 10. For example, with voltage at the direct-current power supply 6 being "E", the maximum amplitude of U-phase voltage is "(2/3)E" (see also the vector diagram of FIG. 2), and with voltage at the direct-current power supply 6 being "E" likewise, the maximum amplitude of phase-to-phase voltage is "E".

The above describes that in the first control mode (=the first low-speed region control mode), the first inverter 11 and the second inverter 12 are controlled by continuous pulse width modulation control (CPWM) in a range in which the modulation indices "Mi_inv1" and "Mi_inv2" are less than "0.3" (see also table 3). In the second low-speed region control mode, since active short-circuit control is performed on the second inverter 12, the modulation index "Mi_inv2" is zero. Therefore, the modulation index "Mi_sys" of the entire system needs to be attained only by the first inverter 11. Since the first low-speed region control mode is also included in the first control mode, the first low-speed region control mode is selected when the modulation index "Mi_sys" of the entire system is the first reference modulation index M1 (here, "0.25"). Hence, the first inverter 11 is controlled by continuous pulse width modulation control (CPWM) in a range in which the modulation index "Mi_inv1" is less than "0.6=0.25×2+0.1", including a margin α (e.g., "0.1") for preventing hunting between control modes.

Meanwhile, as described above, the third region R3 is a control region with a relatively high rotational speed and a relatively high torque in all control regions. Hence, when discontinuous pulse width modulation (multi-pulse modulation) which is synchronous modulation is used as pulse width modulation for controlling the second inverter 12 in the second high-speed region control mode (mode2-2), rotational speed to be synchronized also increases and pulse frequency also increases. In addition, when asynchronous modulation (space vector pulse width modulation or discontinuous pulse width modulation which is asynchronous modulation) is used as pulse width modulation for controlling the second inverter 12, too, since rotational speed is high, carrier frequency increases and pulse frequency also tends to increase.

Since the control scheme for the first inverter 11 in the second high-speed region control mode is rectangular-wave control, the frequency of pulses that control the first inverter 11 is lower than that for the second inverter 12. In the first high-speed region control mode, the control scheme for the first inverter 11 is discontinuous pulse width modulation and the control scheme for the second inverter 12 is continuous pulse width modulation such as space vector pulse width modulation. Therefore, the pulse frequencies are equal to each other or the second inverter 12 has a higher pulse frequency. In the first control mode, pulse width modulation control is performed on both of the two inverters 10, and thus, the pulse frequencies are equal to each other.

As such, in the present embodiment, the first inverter 11 is an inverter 10 that is controlled using pulses with a relatively low switching frequency when pulse width modulation control is performed. On the other hand, the second inverter 12 is an inverter 10 controlled using pulses with a relatively high switching frequency when pulse width modulation control is performed. Note that in the second low-speed region control mode (mode2-2) described above with reference to table 4 and FIGS. 13 and 14, pulse width modulation is performed only on the first inverter 11, and thus, the first inverter 11 has a higher switching frequency than the second inverter 12. However, the second low-speed region control mode is control performed in the first speed region VR1, and the rotational speed of the rotating electrical machine 80 is low and the pulse frequency is also low compared to control performed in the second speed region VR2. Therefore, for the second low-speed region control mode, it is less necessary to consider the switching frequency.

As described above, when pulse width modulation control is performed, the second inverter 12 is controlled using pulses with a relatively high switching frequency compared to the first inverter 11. Hence, it is preferred that the first inverter 11 be configured using the first switching elements 31 whose switching loss upon a transition between an off state and an on state is relatively large and the second inverter 12 be configured using the second switching elements 32 whose switching loss is relatively small. For example, Si-IGBTs or Si-MOSFETs can be used as the first switching elements 31, and SiC-MOSFETs, GaN-MOSFETs, or SiC-IGBTs can be used as the second switching elements 32.

Silicon carbide (SiC) is a compound semiconductor material made of silicon (Si) and carbon (C). SiC has excellent physical properties that the dielectric breakdown field strength is on the order of 10 times that of Si and the bandgap is a wide bandgap on the order of three times that of Si. Furthermore, SiC allows control of a p-type and an n-type required to fabricate a device in a wide range. Due to the fact that the dielectric breakdown field strength of SiC is higher than that of Si, when a high-breakdown voltage power device is configured using SiC, compared to a case in which the device is configured using Si, a drift layer with high impurity concentration and a thin film thickness can be formed. Since almost all resistive component of the high-breakdown voltage power device is the resistance of the drift layer, the on-resistance per unit area of the SiC device is very low compared to the Si device. For example, theoretically, the resistance of the drift layer of the SiC device can be reduced to on the order of ⅟300 per area compared to the resistance of the drift layer of the Si device at the same breakdown voltage.

In addition, the Si device is often configured as a minority carrier device (bipolar device) such as an IGBT in order to improve an increase in on-resistance associated with an increase in breakdown voltage. Note, however, that the IGBT has large switching loss and also has high heat generation in high-frequency driving. On the other hand, the SiC device can implement high breakdown voltage with a majority carrier device (a Schottky barrier diode or a MOSFET) having a high-speed device structure. That is, the SiC device can implement an increase in breakdown voltage, a reduction in on-resistance, and an increase in speed compared to the Si device. In addition, SiC has a wide bandgap and thus can implement a power device that can operate even at higher temperatures than Si. The same can also be said for gallium nitride (GaN). Therefore, it is preferred to use particularly SiC-MOSFETs or GaN-MOSFETs as the second switching elements 32.

Note that the above description is made exemplifying a mode in which the first inverter 11 is connected to the first direct-current power supply 61 to convert electric power between direct current and multiphase alternating current, and the second inverter 12 is connected to the second direct-current power supply 62 which is independent of the first direct-current power supply 61 to convert electric power between direct current and multiphase alternating current. However, a mode may be adopted in which the first inverter 11 and the second inverter 12 that are connected to the same direct-current power supply 6 are controlled independently of each other.

Summary of the Embodiment

A summary of the rotating electrical machine control device (1) described above will be briefly described below.

In a rotating electrical machine control device (1) that controls drive of a rotating electrical machine (80) having multiphase open-end windings (8) which are independent of each other through a first inverter (11) and a second inverter (12), in one aspect, the first inverter (11) is connected to a one-end side of the multiphase open-end windings (8) to convert electric power between direct current and multiphase alternating current, the second inverter (12) is connected to an other-end side of the multiphase open-end windings (8) to convert electric power between direct current and multiphase alternating current, the first inverter (11) and the second inverter (12) can be controlled by a plurality of control schemes, respectively, the control schemes differing from each other in at least one of a switching pattern and a switching frequency and being independent of each other, a first speed region (VR1) in which the rotational speed of the rotating electrical machine (80) is relatively low at the same torque and a second speed region (VR2) in which the rotational speed of the rotating electrical machine (80) is higher than in the first speed region (VR1) are set as control regions of the rotating electrical machine (80), and the rotating electrical machine control device (1) has a control mode in which the first inverter (11) and the second inverter (12) are controlled by the same control scheme in the first speed region (VR1), and the first inverter (11) and the second inverter (12) are controlled by different control schemes in the second speed region (VR2).

For control schemes for controlling the inverters (10), there are known various schemes set based on operating conditions such as the rotational speed, torque, etc., of the rotating electrical machine (80). By controlling the first inverter (11) and the second inverter (12) by control schemes which are independent of each other, the two inverters (10) can be flexibly controlled according to the operating conditions of the rotating electrical machine (80). Furthermore, by providing a control mode in which the first inverter (11) and the second inverter (12) are controlled by different control schemes, flexibility in control increases and drive of the rotating electrical machine (80) can be controlled with high efficiency according to the operating conditions of the rotating electrical machine (80).

Meanwhile, when switching control is performed on the inverters (10), a ripple component superimposed on an alternating-current fundamental may generate audio-frequency band noise. Particularly, when the rotational speed of the rotating electrical machine (80) is low, the possibility of inclusion of the frequency of a ripple component (or sideband frequencies thereof) in an audio-frequency band increases. In addition, when the two inverters (10) are controlled by different control schemes, respectively, a ripple according to each control scheme may occur, which may increase audio-frequency band noise. By controlling the first inverter (11) and the second inverter (12) by the same control scheme in the first speed region (VR1) in which the rotational speed of the rotating electrical machine (80) is relatively low, an increase in audio-frequency band noise can be suppressed. In addition, in the two inverters (10) that allow currents to flow through the open-end windings (8), the phases of the currents differ by substantially 180 degrees from each other. When the two inverters (10) are controlled by the same control scheme, the phases of currents including ripple components differ by substantially 180 degrees from each other. Therefore, at least some of the ripple components can cancel each other out and audio-frequency band noise can also be reduced.

According to this configuration, a control mode is provided in which the first inverter (11) and the second inverter (12) are controlled by the same control scheme in the first speed region (VR1) and the first inverter (11) and the second inverter (12) are controlled by different control schemes in the second speed region (VR2) in which the rotational speed of the rotating electrical machine (80) is higher than in the first speed region (VR1). Therefore, when the rotational speed of the rotating electrical machine (80) is relatively low, audio-frequency band noise is suppressed, and when the rotational speed of the rotating electrical machine (80) is relatively high, drive of the rotating electrical machine (80) can be controlled with high efficiency according to the operating conditions of the rotating electrical machine (80). Namely, according to this configuration, the two inverters (10) provided at respective both ends of the open-end windings (8) can be appropriately controlled.

In addition, it is preferred that in the second speed region (VR2), a control scheme for each of the first inverter (11) and the second inverter (12) be set according to the rotational speed of the rotating electrical machine (80).

The operating conditions of the rotating electrical machine (80) are often defined by a relationship between rotational speed and torque. By the rotating electrical machine control device (1) changing control schemes for controlling the first inverter (11) and the second inverter (12), based on rotational speed which is one parameter, drive of the rotating electrical machine (80) can be controlled with high efficiency according to the operating conditions of the rotating electrical machine (80).

Alternatively, it is preferred that in the second speed region (VR2), a control scheme for each of the first inverter (11) and the second inverter (12) be set according to a ratio of a root-mean-square value of multiphase alternating-current electric power to a root-mean-square value of direct-current electric power.

For example, when high output (high rotational speed or high torque) is required for the rotating electrical machine (80), a voltage-type inverter implements the requirement by increasing direct-current voltage or increasing a ratio at which direct-current voltage is converted into alternating-current voltage. When direct-current voltage is constant, by increasing the ratio at which the direct-current voltage is converted into alternating-current voltage, the requirement can be implemented. This ratio can be represented as a ratio of a root-mean-square value of three-phase alternating-current electric power to a root-mean-square value of direct-current electric power (in a case of a voltage-type inverter, it is equivalent to a ratio of a root-mean-square value of three-phase alternating-current voltage to a root-mean-square value of direct-current voltage). Control schemes for controlling the inverters (10) include various schemes from one in which the ratio is low to one in which the ratio is high. By changing the control schemes based on the ratio of a root-mean-square value of three-phase alternating-current electric power to a root-mean-square value of direct-current electric power which is determined according to a requirement for the rotating electrical machine (80), drive of the rotating electrical machine (80) can be controlled with high efficiency according to the operating conditions of the rotating electrical machine (80).

Here, it is preferred that the control schemes whose switching patterns are different from each other include pulse width modulation control in which a plurality of pulses having different patterns are outputted in one electrical angle cycle, and rectangular-wave control in which one pulse is outputted in one electrical angle cycle.

For control schemes for the rotating electrical machine, there are various different schemes. In pulse width modulation control, the rotating electrical machine can be smoothly driven over a wide range of modulation indices (ratios of a root-mean-square value of multiphase alternating-current electric power to a root-mean-square value of direct-current electric power). In rectangular-wave control, though smoothness is better in the pulse width modulation control, the rotating electrical machine can be driven using the physically (mathematically) highest modulation index value. If pulse width modulation control and rectangular-wave control can be performed as the control schemes whose switching patterns are different from each other, then flexibility in control increases and drive of the rotating electrical machine (80) can be controlled with high efficiency according to the operating conditions of the rotating electrical machine (80).

Here, it is preferred that the pulse width modulation control include continuous pulse width modulation and discontinuous pulse width modulation as the plurality of different control schemes, the continuous pulse width modulation include sinusoidal pulse width modulation and space vector pulse width modulation as the plurality of different control schemes, the discontinuous pulse width modulation include asynchronous modulation in which a pulse is outputted without synchronization with rotation of the rotating electrical machine and synchronous modulation in which a pulse synchronized with rotation of the rotating electrical machine is outputted, as the plurality of different control schemes, and the synchronous modulation include multi-pulse modulation in which a plurality of pulses are outputted per electrical angle cycle of the rotating electrical machine.

Pulse width modulation control has various different schemes. When the first inverter (11) and the second inverter (12) are controlled by pulse width modulation control of different schemes, the two inverters (10) can be flexibly controlled according to the operating conditions of the rotating electrical machine (80).

In addition, it is preferred that in the first inverter (11) and the second inverter (12), an arm (3A) for one alternating-current phase include a series circuit of an upper-stage-side switching element (3H) and a lower-stage-side switching element (3L), and the control schemes whose switching patterns are different from each other include active short-circuit control that brings the upper-stage-side switching elements of the arms for all of a plurality of phases into an on state or brings the lower-stage-side switching elements of the arms for all of the plurality of phases into an on state.

When, as in this configuration, two inverters (10) are provided, alternating-current voltage with a larger amplitude than voltage on the direct-current side of each inverter (10) can be generated. Note, however, that the rotating electrical machine control device (1) does not need to always control the two inverters (10) so as to increase the amplitude of alternating current, and for example, when the rotational speed of the rotating electrical machine (80) is low, it may be sufficient to generate alternating-current voltage that can be generated by one inverter (10). When one of the two inverters (10) is controlled by active short-circuit control, the open-end windings are short-circuited to each other in the one inverter (10). In this case, the other inverter (10) controls drive of the rotating electrical machine (80) having windings connected thereto so as to have a neutral point. That is, by performing active short-circuit control on one inverter (10), the rotating electrical machine (80) can be driven only by the other inverter (10). Since the one inverter (10) does not perform switching operation, the rotating electrical machine (80) can be driven with loss of the entire system suppressed.

In addition, it is preferred that of the first inverter (11) and the second inverter (12), one inverter (10) that is controlled by pulses with a relatively low switching frequency when the pulse width modulation control is performed be configured using first switching elements (31) whose switching loss upon a transition between an off state and an on state is relatively large, and the other inverter (10) that is controlled by pulses with a relatively high switching frequency when the pulse width modulation control is performed be configured using second switching elements (32) whose switching loss is relatively small.

When the two inverters (10) are controlled by different control schemes, respectively, for example, the first inverter (11) may be controlled by rectangular-wave control and the second inverter (12) may be controlled by pulse width modulation control. When a comparison is made between the pulse cycle of the rectangular-wave control and the pulse cycle of the pulse width modulation control, compared to pulses of the rectangular-wave control in which a one-cycle pulse is outputted in synchronization with one electrical angle cycle, pulses of the pulse width modulation control in which multiple pulses are outputted in one electrical angle cycle have a short pulse cycle, and the switching frequency is high. In this case, the switching frequency of the second inverter (12) is high compared to the switching frequency of the first inverter (11). In the reverse case, for example, when the first inverter (11) is controlled by pulse width modulation control and the second inverter (12) is controlled by rectangular-wave control, too, by the same way of thinking, the switching frequency of the first inverter (11) is high compared to the switching frequency of the second inverter (12).

When high output (high rotational speed or high torque) is required for the rotating electrical machine (80), the switching frequency of pulse width modulation control also tends to increase. As a matter of course, the higher the switching frequency, the larger the total amount of loss at the same switching loss. Since the first inverter (11) and the second inverter (12) are controlled independently of each other, their respective circuits can be configured independently of each other. Therefore, it is preferred that one of the inverters (10) whose switching frequency is likely to increase have a circuit configuration in which switching loss is relatively small. Namely, by configuring one of the inverters (10) that is controlled by pulses with a relatively high switching frequency when pulse width modulation control is performed, using the second switching elements (32) whose switching loss is relatively small compared to the first switching elements (31), loss can be reduced.

Here, it is preferred that the first switching elements (31) be Si-IGBTs or Si-MOSFETs, and the second switching elements (32) be SiC-MOSFETs, GaN-MOSFETs, or SiC-IGBTs.

For example, due to the fact that silicon carbide (SiC) is higher in dielectric breakdown field strength than silicon (Si), when a high-breakdown voltage power device is configured, a drift layer with high impurity concentration and a thin film thickness can be formed. Since almost all resistive component of the high-breakdown voltage power device is the resistance of the drift layer, the on-resistance per unit area of a SiC device is low compared to a Si device. That is, the SiC device can reduce switching loss compared to the Si device. The same can also be said for a device using gallium nitride (GaN). Therefore, by using SiC devices or GaN devices as the second switching elements (32) when the first switching elements (31) are Si devices, an inverter (10) can be configured using the second switching elements (32) whose switching loss is relatively small compared to the first switching elements (31).

REFERENCE SIGNS LIST

1: Rotating electrical machine control device, 3: Switching element, 3A: Arm, 3H: Upper-stage-side switching element, 3L: Lower-stage-side switching element, 8: Stator coil (open-end winding), 10: Inverter, 11: First inverter, 12: Second inverter, 31: First switching element, 32: Second switching element, 80: Rotating electrical machine, VR1: First speed region, and VR2: Second speed region

The invention claimed is:

1. A rotating electrical machine control device that controls drive of a rotating electrical machine having multiphase open-end windings through a first inverter and a second inverter, the multiphase open-end windings being independent of each other, wherein
the first inverter is connected to a one-end side of the multiphase open-end windings to convert electric power between direct current and multiphase alternating current,
the second inverter is connected to an other-end side of the multiphase open-end windings to convert electric power between direct current and multiphase alternating current,
the first inverter and the second inverter can be controlled by a plurality of control schemes, respectively, the control schemes differing from each other in at least one of a switching pattern and a switching frequency and being independent of each other,
a first speed region in which rotational speed of the rotating electrical machine is relatively low at same torque and a second speed region in which rotational speed of the rotating electrical machine is higher than in the first speed region are set as control regions of the rotating electrical machine, and
the rotating electrical machine control device has a control mode in which the first inverter and the second inverter are controlled by a same control scheme in the first speed region, and the first inverter and the second inverter are controlled by different control schemes in the second speed region,
wherein the first inverter is configured to receive a direct current from a first battery when the rotating electrical machine is driven, and the second inverter is configured to receive a direct current from a second battery when the electrical machine is driven.

2. The rotating electrical machine control device according to claim 1, wherein in the second speed region, a control scheme for each of the first inverter and the second inverter is set according to rotational speed of the rotating electrical machine.

3. The rotating electrical machine control device according to claim 1, wherein in the second speed region, a control scheme for each of the first inverter and the second inverter is set according to a ratio of a root-mean-square value of multiphase alternating-current electric power to a root-mean-square value of direct-current electric power.

4. The rotating electrical machine control device according to claim 1, wherein the control schemes whose switching patterns are different from each other include pulse width modulation control in which a plurality of pulses having different patterns are outputted in one electrical angle cycle, and rectangular-wave control in which one pulse is outputted in one electrical angle cycle.

5. The rotating electrical machine control device according to claim 4, wherein
the pulse width modulation control includes continuous pulse width modulation and discontinuous pulse width modulation as the plurality of different control schemes,
the continuous pulse width modulation includes sinusoidal pulse width modulation and space vector pulse width modulation as the plurality of different control schemes,
the discontinuous pulse width modulation includes asynchronous modulation in which a pulse is outputted without synchronization with rotation of the rotating electrical machine and synchronous modulation in which a pulse synchronized with rotation of the rotating electrical machine is outputted, as the plurality of different control schemes, and
the synchronous modulation includes multi-pulse modulation in which a plurality of pulses are outputted per electrical angle cycle of the rotating electrical machine.

6. The rotating electrical machine control device according to claim 4, wherein
in the first inverter and the second inverter, an arm for one alternating-current phase includes a series circuit of an upper-stage-side switching element and a lower-stage-side switching element, and the control schemes whose switching patterns are different from each other include active short-circuit control that brings the upper-stage-side switching elements of the arms for all of a plurality of phases into an on state or brings the lower-stage-side switching elements of the arms for all of the plurality of phases into an on state.

7. The rotating electrical machine control device according to claim 4, wherein of the first inverter and the second inverter, one inverter that is controlled by a pulse with a relatively low switching frequency when the pulse width modulation control is performed is configured using first switching elements whose switching loss upon a transition between an off state and an on state is relatively large, and an other inverter that is controlled by a pulse with a relatively high switching frequency when the pulse width modulation control is performed is configured using second switching elements whose switching loss is relatively small.

8. The rotating electrical machine control device according to claim 7, wherein the first switching elements are Si-IGBTs or Si-MOSFETs, and the second switching elements are SiC-MOSFETs, GaN-MOSFETs, or SiC-IGBTs.

9. The rotating electrical machine control device according to claim 5, wherein
in the first inverter and the second inverter, an arm for one alternating-current phase includes a series circuit of an upper-stage-side switching element and a lower-stage-side switching element, and
the control schemes whose switching patterns are different from each other include active short-circuit control that brings the upper-stage-side switching elements of the arms for all of a plurality of phases into an on state or brings the lower-stage-side switching elements of the arms for all of the plurality of phases into an on state.

10. The rotating electrical machine control device according to claim 9, wherein of the first inverter and the second inverter, one inverter that is controlled by a pulse with a relatively low switching frequency when the pulse width modulation control is performed is configured using first switching elements whose switching loss upon a transition between an off state and an on state is relatively large, and an other inverter that is controlled by a pulse with a relatively high switching frequency when the pulse width modulation control is performed is configured using second switching elements whose switching loss is relatively small.

11. The rotating electrical machine control device according to claim 10, wherein the first switching elements are Si-IGBTs or Si-MOSFETs, and the second switching elements are SiC-MOSFETs, GaN-MOSFETs, or SiC-IGBTs.

12. A rotating electrical machine control device that controls drive of a rotating electrical machine having multiphase open-end windings through a first inverter and a second inverter, the multiphase open-end windings being independent of each other, wherein
the first inverter is connected to a one-end side of the multiphase open-end windings to convert electric power between direct current and multiphase alternating current,
the second inverter is connected to an other-end side of the multiphase open-end windings to convert electric power between direct current and multiphase alternating current,
the first inverter and the second inverter can be controlled by a plurality of control schemes, respectively, the control schemes differing from each other in at least one of a switching pattern and a switching frequency and being independent of each other,
a first speed region in which rotational speed of the rotating electrical machine is relatively low at same torque and a second speed region in which rotational speed of the rotating electrical machine is higher than in the first speed region are set as control regions of the rotating electrical machine, and
the rotating electrical machine control device has a control mode in which the first inverter and the second inverter are controlled by a same control scheme in the first speed region, and the first inverter and the second inverter are controlled by different control schemes in the second speed region,
wherein the first inverter is configured to receive a direct current power supply from a first direct current source and includes a first capacitor in parallel between the first inverter and the first direct current source, and the second inverter is configured to receive a direct current power supply from a second direct current source and includes a second capacitor in parallel between the second inverter and the second direct current source.

13. The rotating machine according to claim 1, wherein when the first inverter and the second inverter are controlled by the same control scheme, phases of currents including ripple components differ by substantially 180 degrees from each other in the respective converters.

14. The rotating machine according to claim 12, wherein when the first inverter and the second inverter are controlled by the same control scheme, phases of currents including ripple components differ by substantially 180 degrees from each other in the respective converters.

* * * * *